US009065866B2

(12) United States Patent
Agarwal et al.

(10) Patent No.: US 9,065,866 B2
(45) Date of Patent: Jun. 23, 2015

(54) SYSTEMS AND METHODS FOR POLICY BASED INTEGRATION TO HORIZONTALLY DEPLOYED WAN OPTIMIZATION APPLIANCES

(75) Inventors: Mugdha Agarwal, Bangalore (IN); Akshat Choudhary, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 369 days.

(21) Appl. No.: 13/337,712

(22) Filed: Dec. 27, 2011

(65) Prior Publication Data
US 2012/0173759 A1 Jul. 5, 2012

Related U.S. Application Data

(60) Provisional application No. 61/428,022, filed on Dec. 29, 2010.

(51) Int. Cl.
*G06F 15/16* (2006.01)
*H04L 29/08* (2006.01)
*H04L 29/06* (2006.01)

(52) U.S. Cl.
CPC ........ *H04L 67/2814* (2013.01); *H04L 67/2819* (2013.01); *H04L 69/22* (2013.01); *H04L 69/161* (2013.01); *H04L 67/2876* (2013.01)

(58) Field of Classification Search
USPC .......................... 709/238, 241, 227, 224, 203
See application file for complete search history.

(56) References Cited

U.S. PATENT DOCUMENTS

| | | | |
|---|---|---|---|
| 5,774,668 A * | 6/1998 | Choquier et al. ............. 709/203 |
| 7,123,613 B1 | 10/2006 | Chawla et al. |
| 7,664,857 B2 * | 2/2010 | Ovsiannikov et al. ........ 709/224 |
| 2007/0239886 A1 | 10/2007 | Montemayor et al. |
| 2008/0229021 A1 * | 9/2008 | Plamondon .................... 711/125 |
| 2008/0250099 A1 * | 10/2008 | Shen et al. ..................... 709/203 |
| 2008/0281908 A1 * | 11/2008 | McCanne et al. ............. 709/203 |
| 2008/0298366 A1 * | 12/2008 | Appiah et al. ................. 370/392 |
| 2010/0098092 A1 * | 4/2010 | Luo et al. ....................... 370/401 |
| 2010/0250757 A1 * | 9/2010 | Akhter et al. ................. 709/229 |
| 2010/0318665 A1 | 12/2010 | Demmer et al. |

OTHER PUBLICATIONS

International Search Report on PCT/US2011/067381 dated Mar. 21, 2012.
Written Opinion on PCT/US2011/067381 dated Mar. 21, 2012.

* cited by examiner

*Primary Examiner* — Philip B Tran
(74) *Attorney, Agent, or Firm* — Foley & Lardner LLP; Christopher J. McKenna; Shabbi S. Khan

(57) ABSTRACT

The present disclosure presents systems and methods for policy-based redirection of network traffic, by an intermediary device, to a horizontally deployed WAN device. An intermediary receives a request from a client to access a server. The request was previously modified by a first WAN device to include information in an option field of a transport layer. The intermediary may determine, responsive to a redirection policy, to send the request to a second WAN device deployed horizontally from the intermediary, instead of the server. The intermediary transmits the request to the second WAN device, while maintaining the information from the option field. The intermediary device receives the request including the information identifying the first WAN optimization device to the second WAN device. The intermediary receives a modified request from the second WAN device, the modified request determined by the intermediary to be sent to the destination server.

20 Claims, 25 Drawing Sheets

SYSTEMS AND METHODS FOR POLICY BASED INTEGRATION TO HORIZONTALLY DEPLOYED WAN OPTIMIZATION APPLIANCES

RELATED APPLICATIONS

This present application claims priority to and the benefit of U.S. Provisional Patent Application No. 61/428,022, entitled "Systems and Methods for Policy Based Integration to Horizontally Deployed WAN optimization Appliances," filed Dec. 29, 2010, which is hereby incorporated by reference in its entirety.

FIELD OF THE INVENTION

The present application generally relates to data communication networks. In particular, the present application relates to systems and methods for redirection to wide area network optimization services by an intermediary device.

BACKGROUND OF THE INVENTION

A corporate or enterprise may deploy a number of services across a network to enhance the quality of service provided by the enterprise to the clients accessing the services via servers of the enterprise. The data centers of the enterprise may be optimized in a number of ways to meet the demand and load from the volume of clients' requests. In some configurations, the enterprise may further provide one or more intermediaries to manage the network traffic intercepted from the clients to the back end servers of the enterprise. In further configurations, one or more services or devices may be desired to be deployed in the data center to provide additional optimizations or services to the network traffic. Adding the additional services or devices may be a challenge to the current topology and network traffic processing pipeline.

BRIEF SUMMARY OF THE INVENTION

The present disclosure relates to systems and methods for redirecting client requests, by an intermediary network device, to horizontally deployed Wide Area Network (WAN) optimization network devices providing service to the client request. The present disclosure may also relate to systems and methods for maintaining services provided to a client request by one or more WAN optimization devices on a network while servicing the network request by an intermediary network device. In some configurations, the present disclosure describes systems and methods for maintaining, by an intermediary device servicing a client request, protocol specific services, such as a transmission control protocol (TCP) services, provided by one or more WAN optimization devices to the client request by redirection of the client request. In some configurations, the present disclosure relates to a cache redirection mechanism of an intermediary device that may utilize a policy to identify if the client request has already been serviced by a WAN optimization device and if the client request needs to be serviced by another WAN optimization device again prior to forwarding the client request to the virtual server or the intended destination server.

In some instances, the present disclosure relates to systems and methods for redirecting requests by an intermediary to a horizontally deployed Wide Area Network optimization device. An intermediary device deployed between a plurality of clients and one or more servers may receive via a first transport layer connection, a first request from a client to access a server. The first request may be modified by a first Wide Area Network (WAN) optimization device deployed between the client and the intermediary device to include information in a first option field of a transport layer that may be processed, or that is processable, by a second WAN optimization device. The intermediary may determine, responsive to a redirection policy, to send the first request to the second WAN optimization device instead of the server. The intermediary device may establish a second transport layer connection with the second WAN optimization device deployed horizontally to the intermediary device. The intermediary device may transmit the first request to the second WAN optimization device via the second transport layer connection. The intermediary device may maintain the information from the first option field of the first request in a second option field of a transport layer. The second option field may be of the first request. In some embodiments, the second option field is an option field of a second request. The intermediary device may receive the first request including the information in the first option field identifying the first WAN optimization device to the second WAN optimization device.

In some embodiments, the intermediary device receives the first request including the information in the first option field identifying to the second WAN optimization device instructions on processing a payload of the first request. In certain embodiments, the intermediary device determines to send the first request to the second WAN optimization device responsive to the redirection policy identifying a presence of the information in the first option field. In specific embodiments, the intermediary device determines to send the first request to the second WAN optimization device responsive to evaluating an expression of the redirection policy to the first option field. In some embodiments, the intermediary device establishes a second transport layer connection with the second WAN optimization device of a plurality of WAN optimization devices deployed horizontally to the intermediary device.

In some embodiments, the intermediary device receives the first request processed by the second WAN optimization device to uncompress a payload of the first request. In some embodiments, the intermediary device receives the first request processed by the second WAN optimization device to form a second request. In specific embodiments, the intermediary device determines that the second request is received after processing by the second WAN optimization device and transmits the second request to the server identified by the first request. In some embodiments, the intermediary device determines that the second request is received after processing by the second WAN optimization device and a cache redirection virtual server of the intermediary device transmits the second request to a virtual server of the intermediary device managing the server.

In some aspects, the present disclosure relates to a system of redirecting requests by an intermediary to a horizontally deployed Wide Area Network optimization device. A first Wide Area Network (WAN) optimization device deployed between a plurality of clients and a server may receive a first request from a client to access a server and modify the first request to include information in a first option field of a transport layer processable by a second WAN optimization device. An intermediary device deployed between a plurality of clients and one or more servers may receive, via a first transport layer connection, the first request from the first WAN optimization device. A cache redirection virtual server of the intermediary device may determine, responsive to a redirection policy, to send the first request to the second WAN optimization device instead of the server. The intermediary device may establish a second transport layer connection with the second WAN optimization device deployed horizontally to the intermediary device. The intermediary may transmit the first request to the second WAN optimization device via the second transport layer connection, the intermediary device maintaining the information from the first option field of the first request in a second option field of a transport layer of the first request.

In some embodiments, the intermediary device receives the first request including the information in the first option field identifying the first WAN optimization device to the second WAN optimization device. In certain embodiments, the intermediary device receives the first request including the information in the first option field identifying to the second WAN optimization device instructions on processing a payload of the first request. In some embodiments, the cache redirection virtual server determines to send the first request to the second WAN optimization device responsive to the redirection policy identifying a presence of the information in the first option field. In further embodiments, the cache redirection virtual server determines to send the first request to the second WAN optimization device responsive to evaluating an expression of the redirection policy to the first option field. In certain embodiments, the intermediary device establishes the second transport layer connection with the second WAN optimization device of a plurality of WAN optimization devices deployed horizontally to the intermediary device. In some embodiments, the intermediary device receives the first request processed by the second WAN optimization device to uncompress a payload of the first request. In some embodiments, the intermediary device receives the first request processed by the second WAN optimization device to form a second request. In certain embodiments, the intermediary device determines that the second request is received after processing by the second WAN optimization device and transmits the second request to the server identified by the first request. In specific embodiments, the intermediary device determines that the second request is received after processing by the second WAN optimization device and the cache redirection virtual server of the intermediary device communicates the second request to a second virtual server of the intermediary device managing the server.

In another aspect, the present disclosure is directed to a method for redirecting client requests, by an intermediary device, to a horizontally deployed Wide Area Network (WAN) optimization device providing service to the client request. The method includes receiving via a first transport layer connection, by an intermediary device deployed between a plurality of clients and one or more servers, a first request from a first client of the plurality of clients to access a first server of the one or more servers, the first request modified by a first Wide Area Network (WAN) optimization device deployed between the client and the intermediary device to include information in a first option field of a transport layer header of the first request for processing by a second WAN optimization device. The method further includes determining, by the intermediary device, responsive to a redirection policy, to send the first request to the second WAN optimization device instead of the server, the second WAN optimization device deployed horizontally to the intermediary device. The method also includes establishing, by the intermediary device, a second transport layer connection with the second WAN optimization device. The method also includes transmitting, by the intermediary device, the first request to the second WAN optimization device via the second transport layer connection.

In some embodiments, the method includes including the information in the first option field of the first request in a second option field of a transport layer header of the first request send via the second transport layer connection to the second WAN optimization device. In other embodiments, the information included in the first option field of the first request for processing by the second WAN optimization device comprises information identifying the first WAN optimization device to the second WAN optimization device. In still other embodiments, the information included in the first option field of the first request comprises instructions to the second WAN optimization device for processing a payload of the first request.

In some embodiments, determining to send the first request to the second WAN optimization device instead of the server comprises identifying a presence of the information in the first option field of the first request. In other embodiments, determining to send the first request to the second WAN optimization device instead of the server comprises comparing a source IP address of the first client to a predetermined IP address. In still other embodiments, the method includes receiving, by the intermediary device from the second WAN optimization device, the first request processed by the second WAN optimization device to uncompress a payload of the first request. In still yet other embodiments, the method includes receiving, by the intermediary device from the second WAN optimization device, the first request processed by the second WAN optimization device to form a second request and determining, by the intermediary device, to transmit the second request to the server identified by the first request, responsive to identifying that the second request is received after processing of the first request by the second WAN optimization device.

In yet another aspect, the present disclosure is directed to a method for redirecting a message between a client and server, by an intermediary device, to a horizontally deployed network device providing a predetermined service to the message. The method includes receiving via a first transport layer connection, by an intermediary device deployed between a plurality of clients and one or more servers, a message between a client of the plurality of clients and a server of the one or more servers, the message comprising a transport layer option recognizable by a second network device providing a predetermined service. The method also includes determining, by a virtual server of the intermediary device, that the message comprises the transport layer option matching an expression of a policy of the virtual server, the policy identifying that the message is to be redirected to the second network device for further processing. The method further includes transmitting, by the virtual server via a second transport layer connection responsive to the determination, the message to the second network device, the second network device processing the message to provide the predetermined service. The method also includes receiving, by the intermediary device, the message processed by the second network device.

In some embodiments, the method includes receiving, by the intermediary device, the message comprising one of a request from the client to the server or one of a response from the server to the client. In other embodiments, the method includes determining, by the virtual server, that one of a name or a value of the transport layer option in the message matches the expression of the policy. In still other embodiments, the method includes including, by the virtual server, in the message redirected to the second network device the transport layer option matching the policy. In yet still other embodiments, the method includes determining, by the intermediary device via the media access control (MAC) address of the processed message, that the processed message was transmitted by the second network device. In some embodiments, the method includes determining, by the intermediary device, to transmit the processed message to one of the client or the server.

In yet another aspect, the present disclosure is directed to a system for redirecting a message between a client and server, by an intermediary device, to a horizontally deployed network device providing a predetermined service to the message. The system includes an intermediary device deployed between a plurality of clients and one or more servers. The system also includes a second network device deployed horizontally to the intermediary device, the second network device providing a predetermined service. The intermediary device receives a message between a client of the plurality of clients and a server of the one or more servers, the message comprising a transport layer option recognizable by the second network device. A virtual server of the intermediary device determines that the message comprises the transport layer option matching an expression of a policy of the virtual server, the policy identifying that the message is to be redirected to the second network device for further processing and transmits via a second transport layer connection responsive to the determination, the message to the second network device, the second network device processing the message to provide the predetermined service. The intermediary device receives the message processed by the second network device.

In some embodiments, the intermediary device receives the message comprising one of a request from the client to the server or one of a response from the server to the client. In other embodiments, the virtual server determines that one of a name or a value of the transport layer option in the message matches the expression of the policy. In yet other embodiments, the virtual server includes in the request redirected to the second network device the transport layer option matching the policy. In still yet other embodiments, the intermediary device determines via the media access control (MAC) address of the processed message that the processed message was transmitted by the second network device. In some embodiments, the intermediary device determines to transmit the processed message to one of the client or the server.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment; and Section F describes embodiments of systems and methods for policy based cache redirection to WAN Optimization Devices;

Section G describes embodiments of systems and methods for using a listening policy for a virtual server on an intermediary device; and Section H describes embodiments of systems and methods for policy based integration of horizontally deployed appliances 205, such as WAN Optimization Appliances or Wanscalers.

A. Network and Computing Environment

Figure 1A:
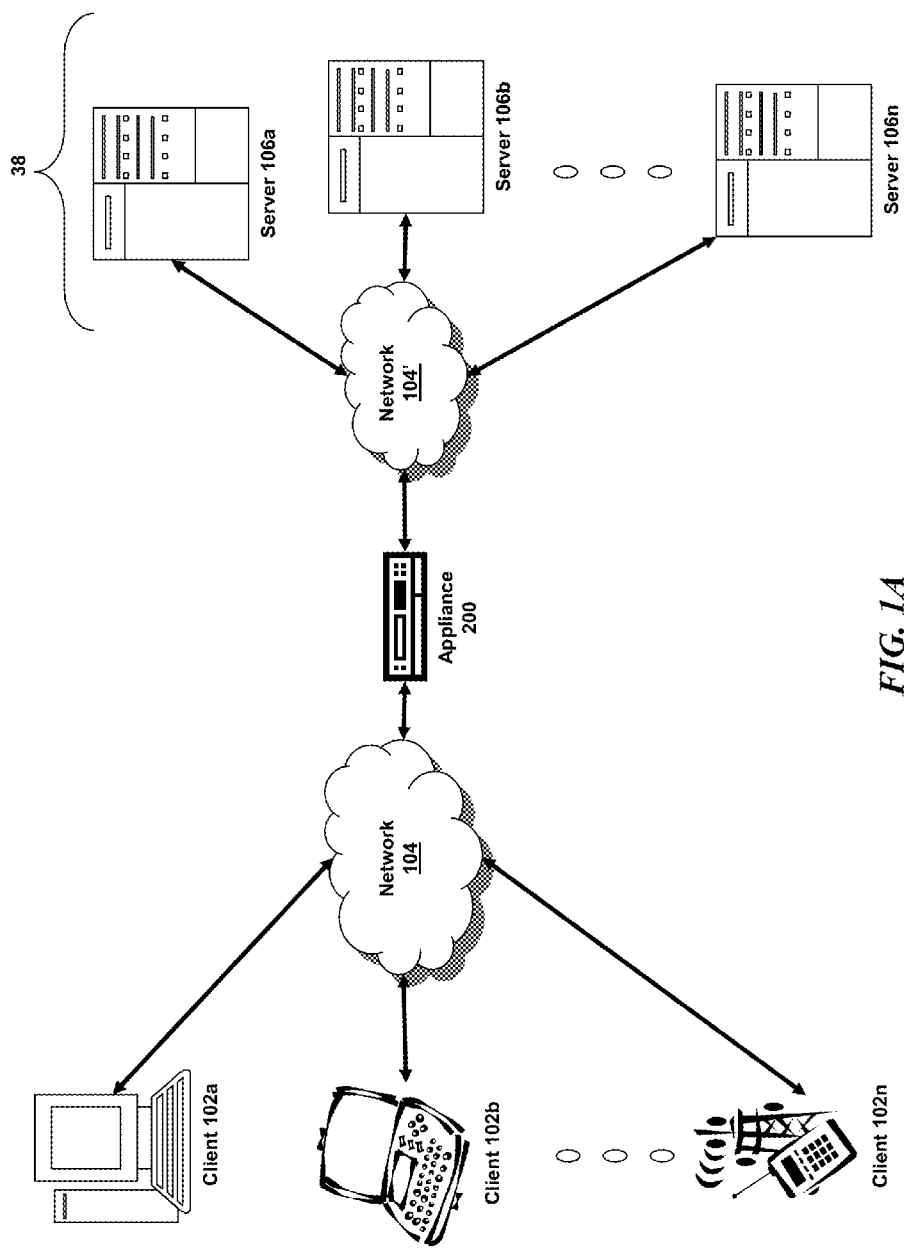
FIG. 1A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
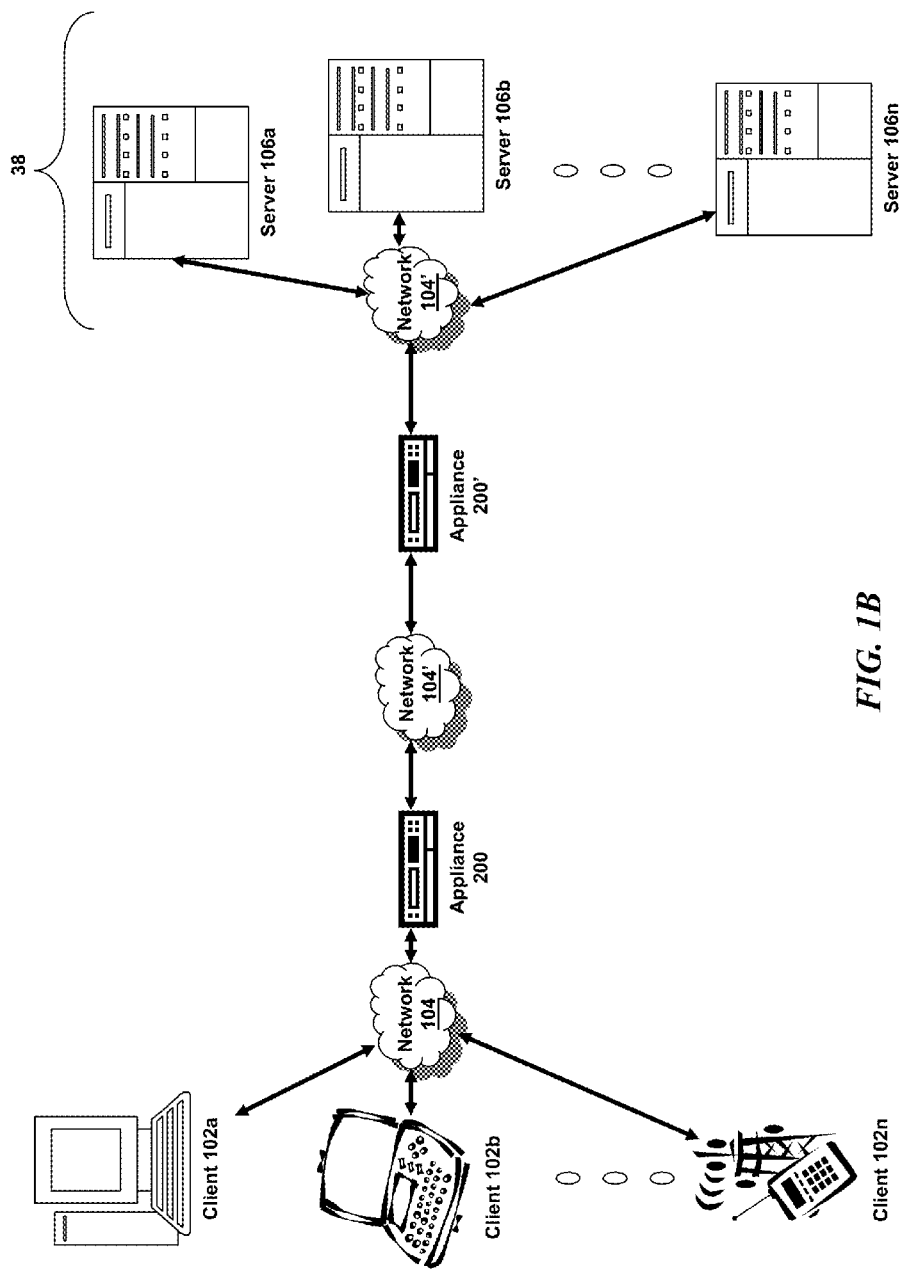
FIG. 1B is a block diagram of an embodiment of an environment for delivering a computing environment from a server to a client via an appliance.
Figure 1C:
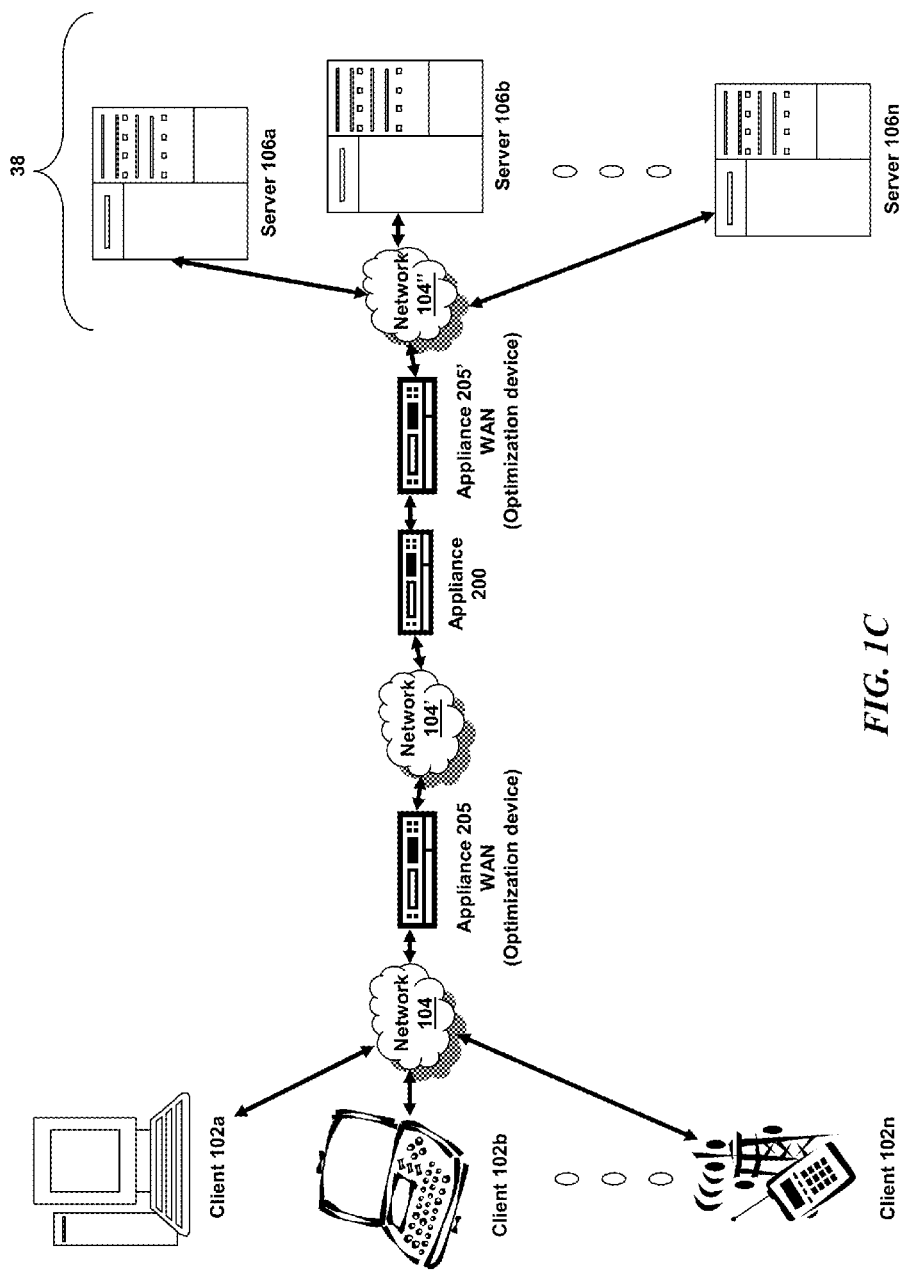
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200' may be deployed for a second server farm 38'. In another example, a first appliance 200 may be deployed at a first branch office while the second appliance 200' is deployed at a second branch office. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
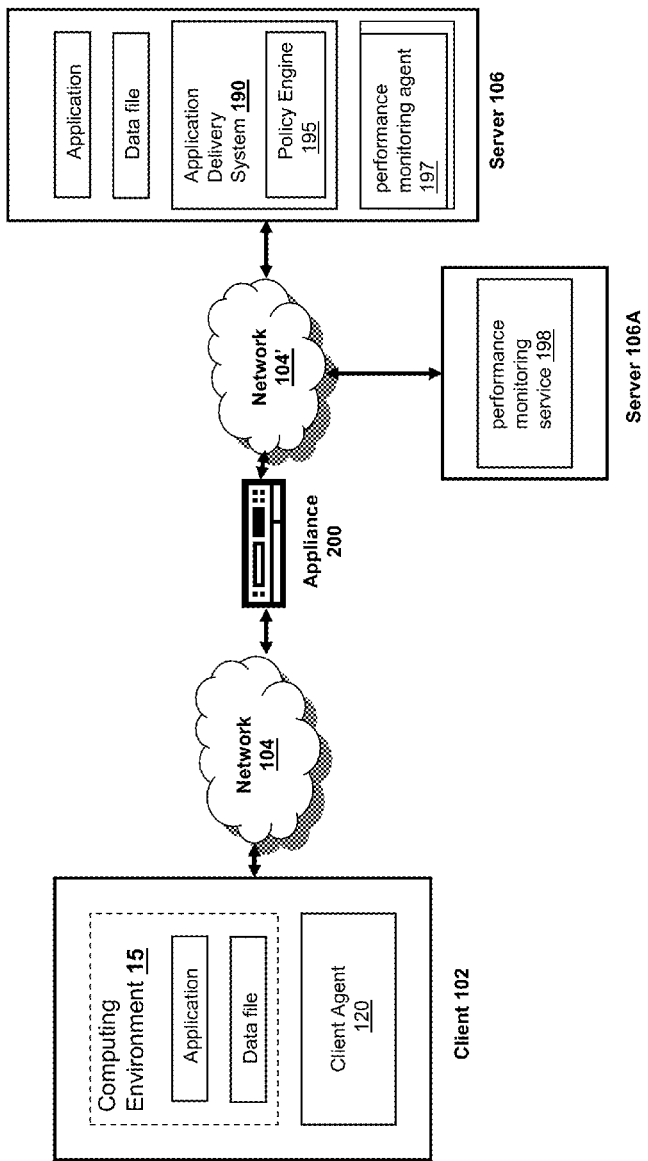
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
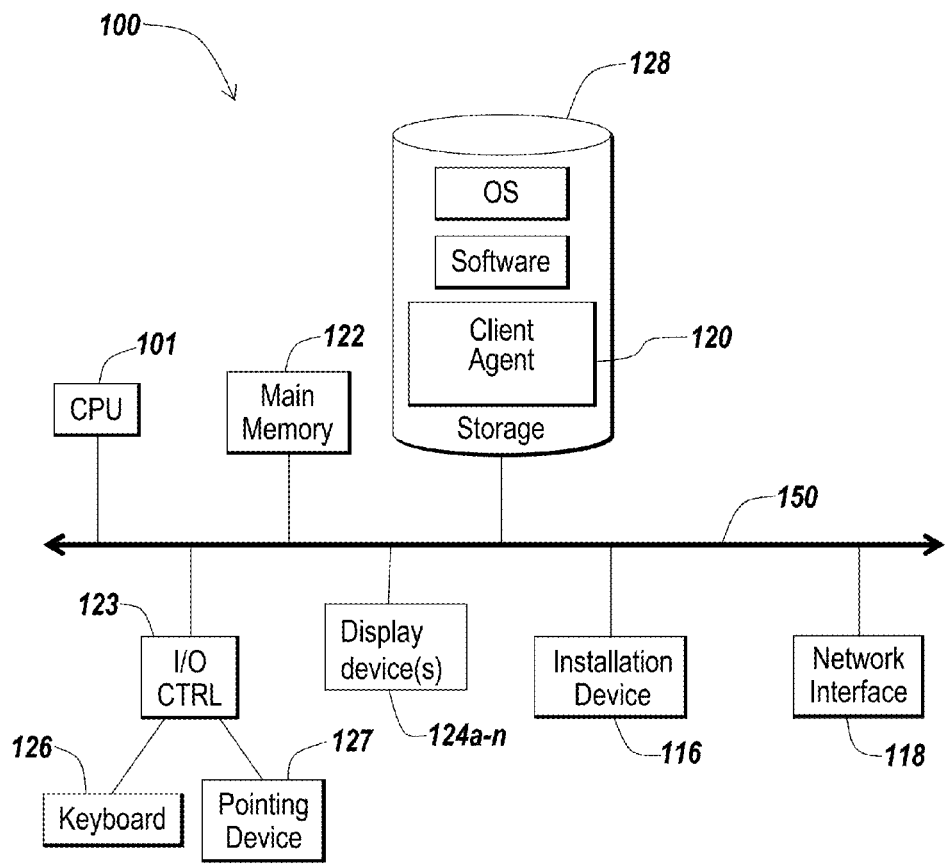
FIGS. 1E-1H are block diagrams of embodiments of a computing device.
Figure 1F:
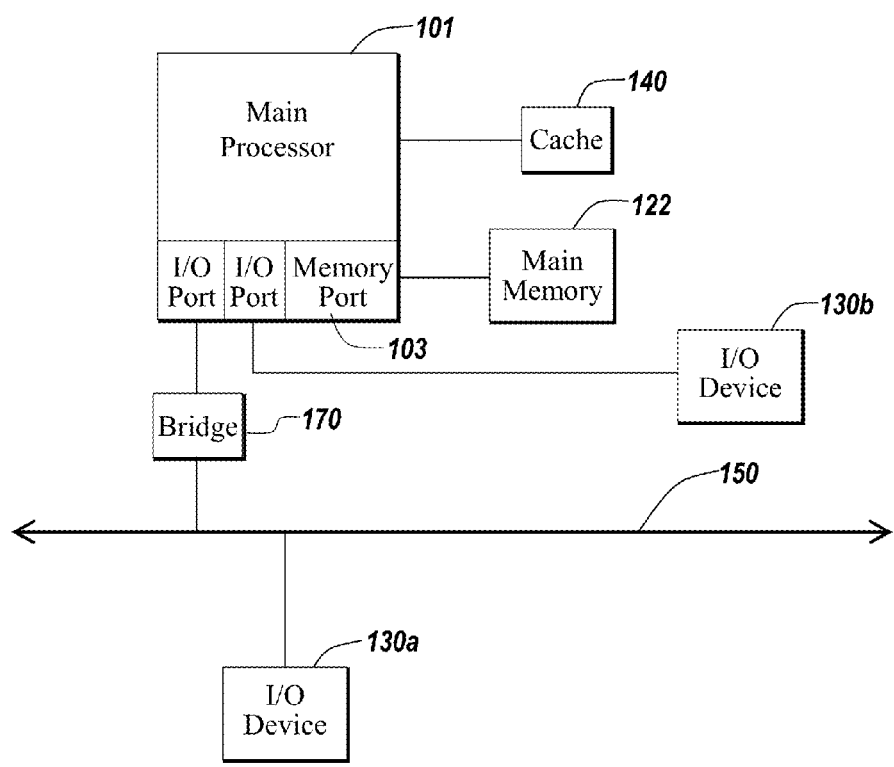

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, California.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, California; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
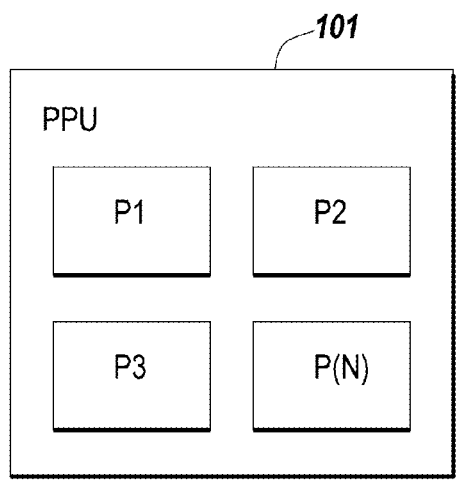

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
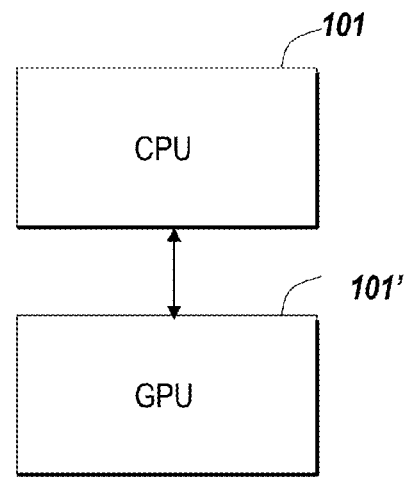

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
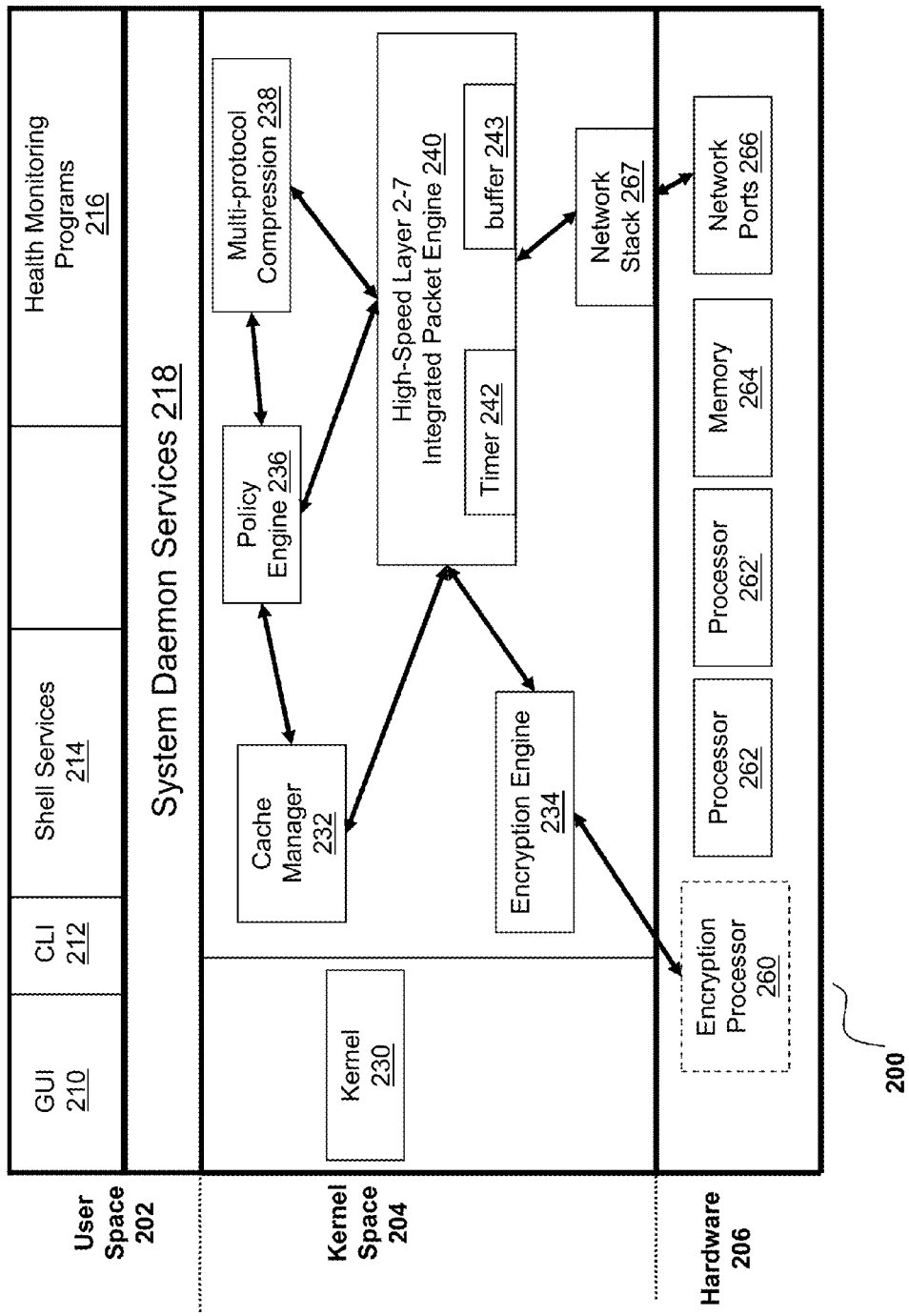
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2A, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
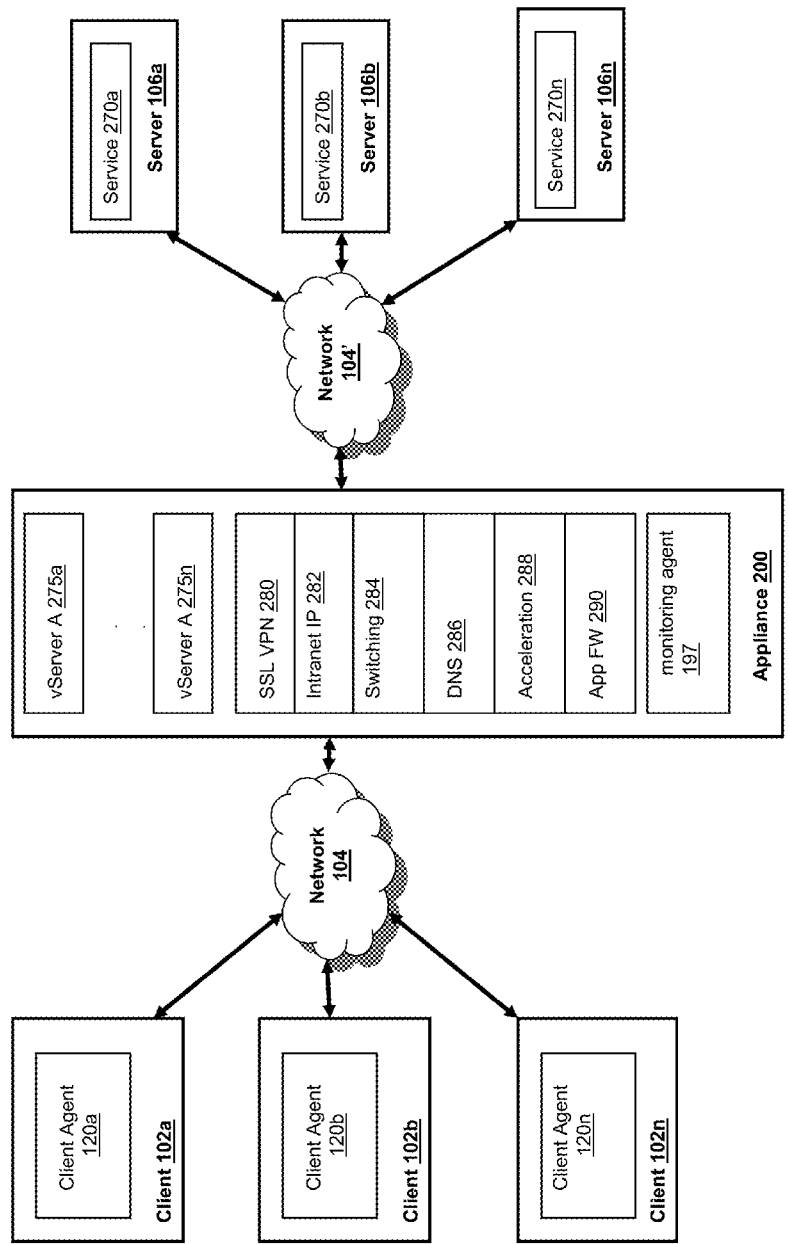
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
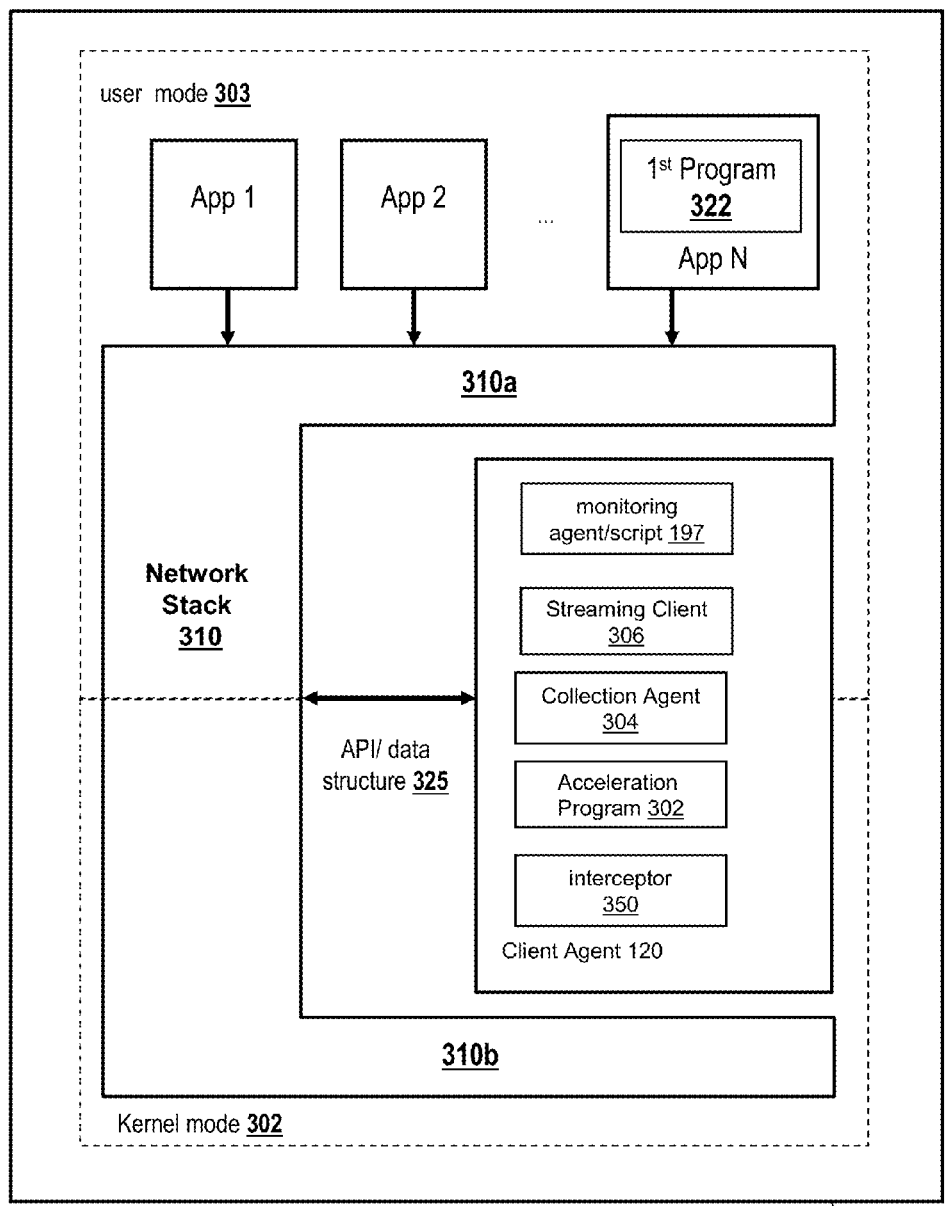
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof.

The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202.

In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such as an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
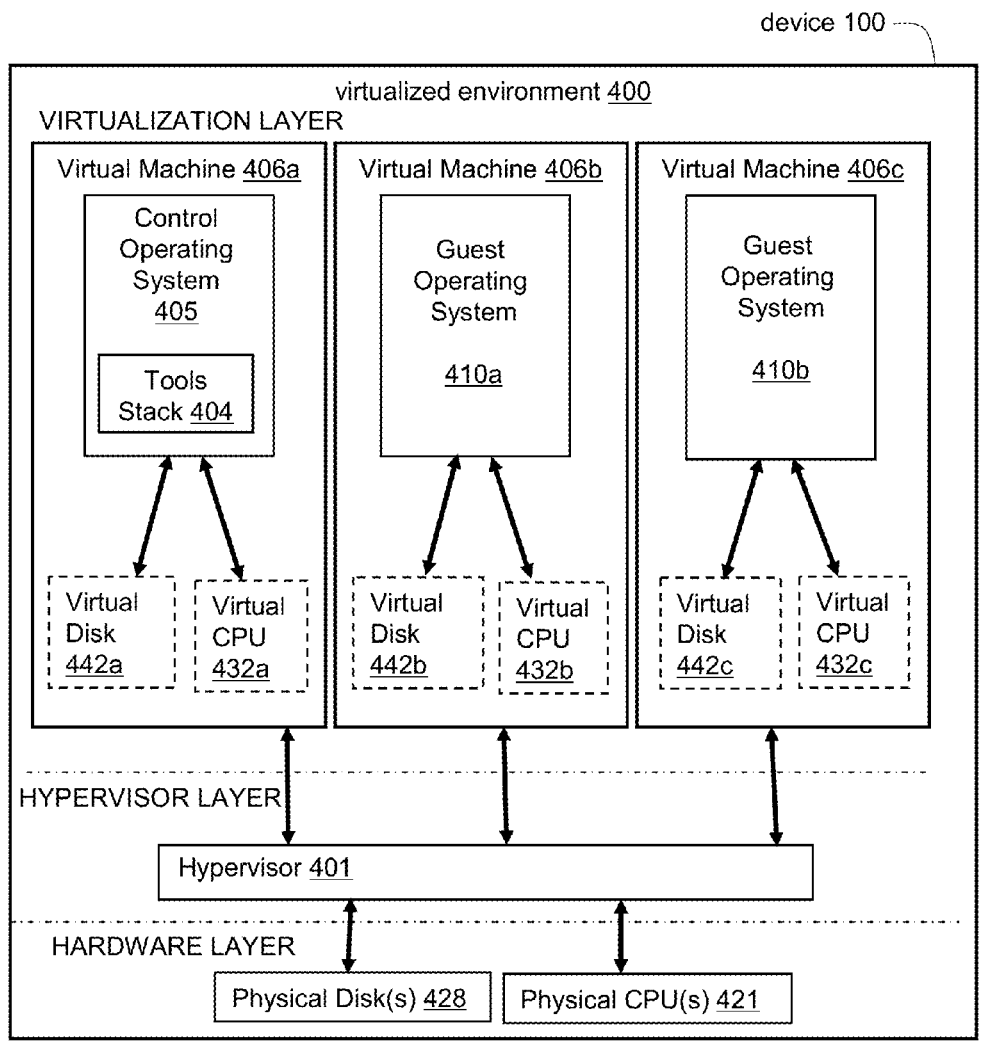
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406*a-c* (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405*a* on a computing device 100*a* may exchange data with a control operating system 405*b* on a computing device 100*b*, via communications between a hypervisor 401*a* and a hypervisor 401*b*. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100*b*), or managing virtual machines 406*b*, 406*c* on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
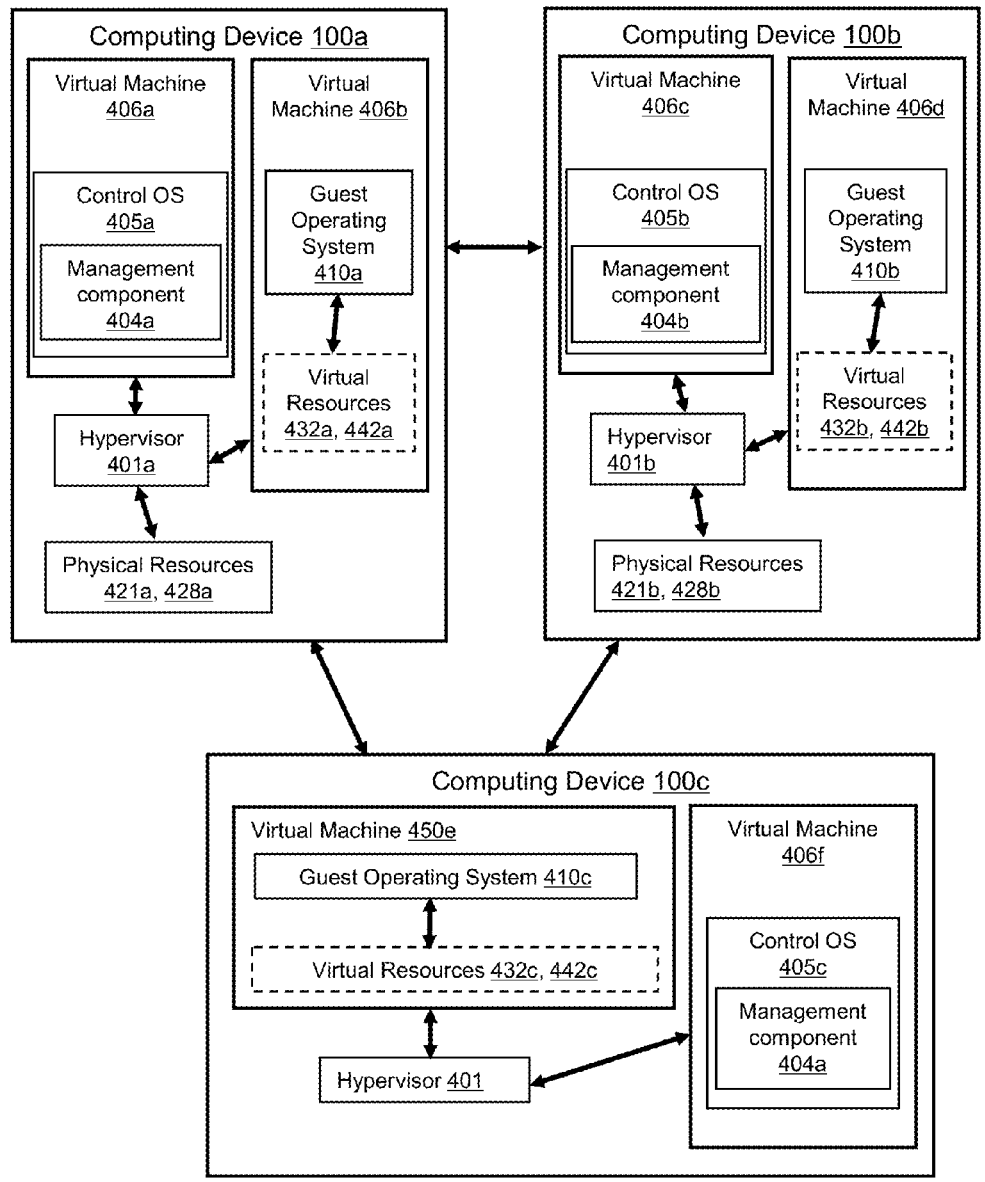
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404*a* is referred to as a pool management component 404*a*. In another embodiment, a management operating system 405*a*, which may be referred to as a control operating system 405*a*, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406*b* from one physical machine 100 to another. In further embodiments, the management component 404*a* identifies a computing device 100*b* on which to execute a requested virtual machine 406*d* and instructs the hypervisor 401*b* on the identified computing device 100*b* to execute the identified virtual machine; such a management component may be referred to as a pool management component.

Figure 4C:
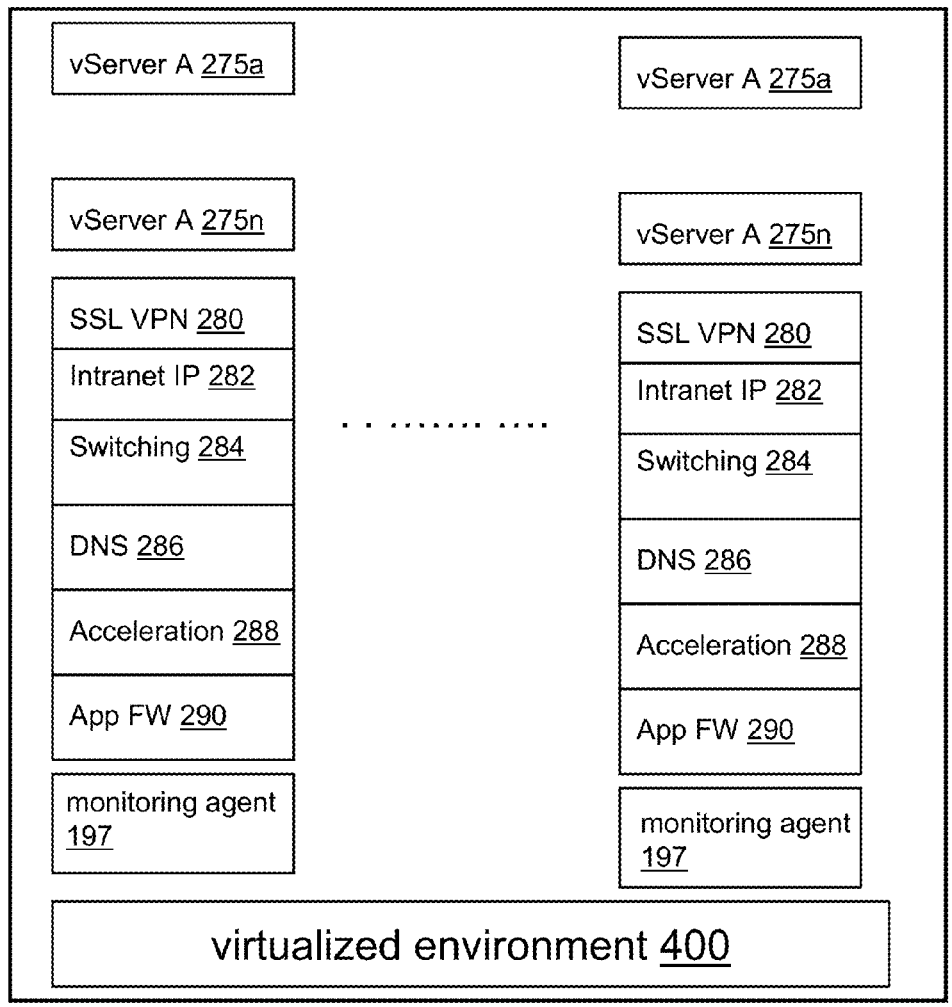
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406*a*-406*n* in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
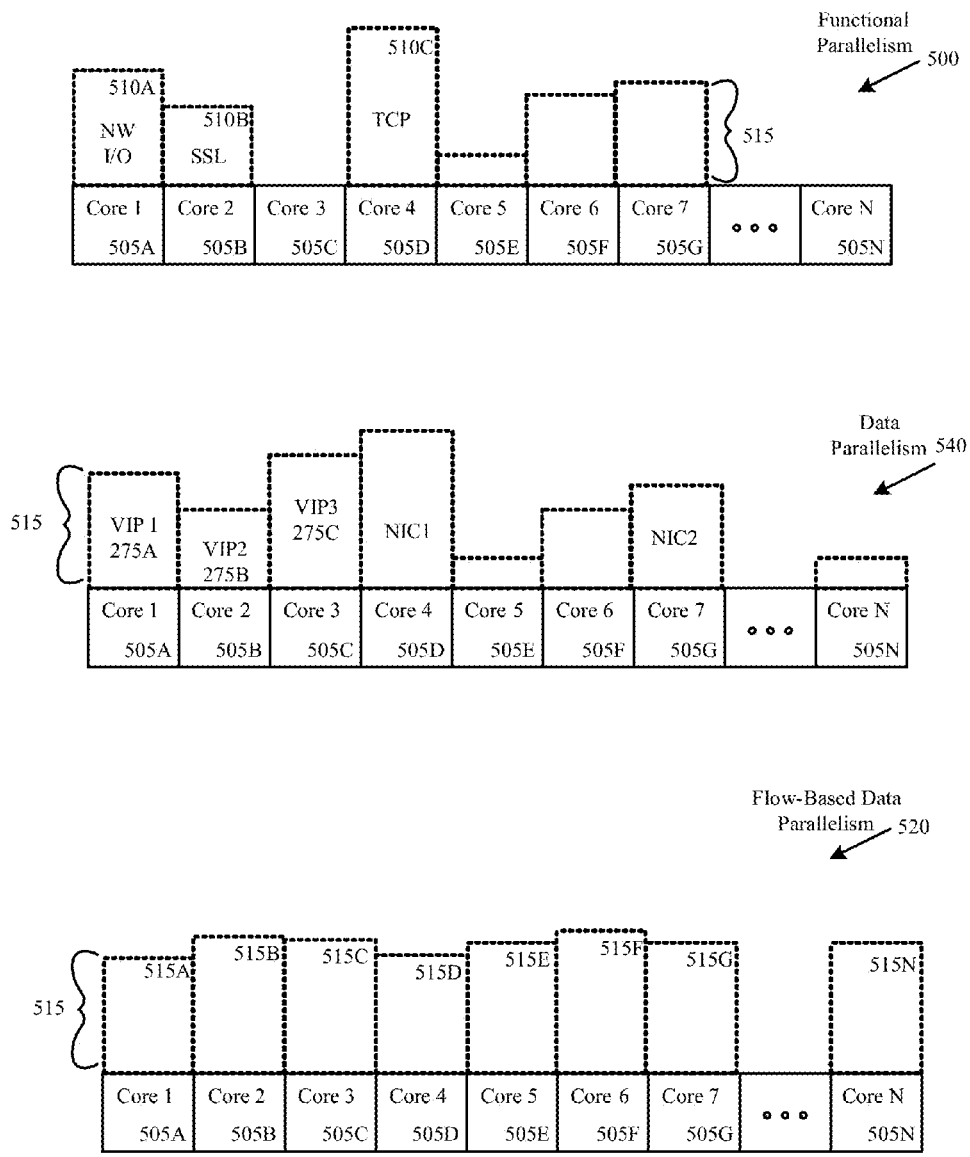
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200'while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
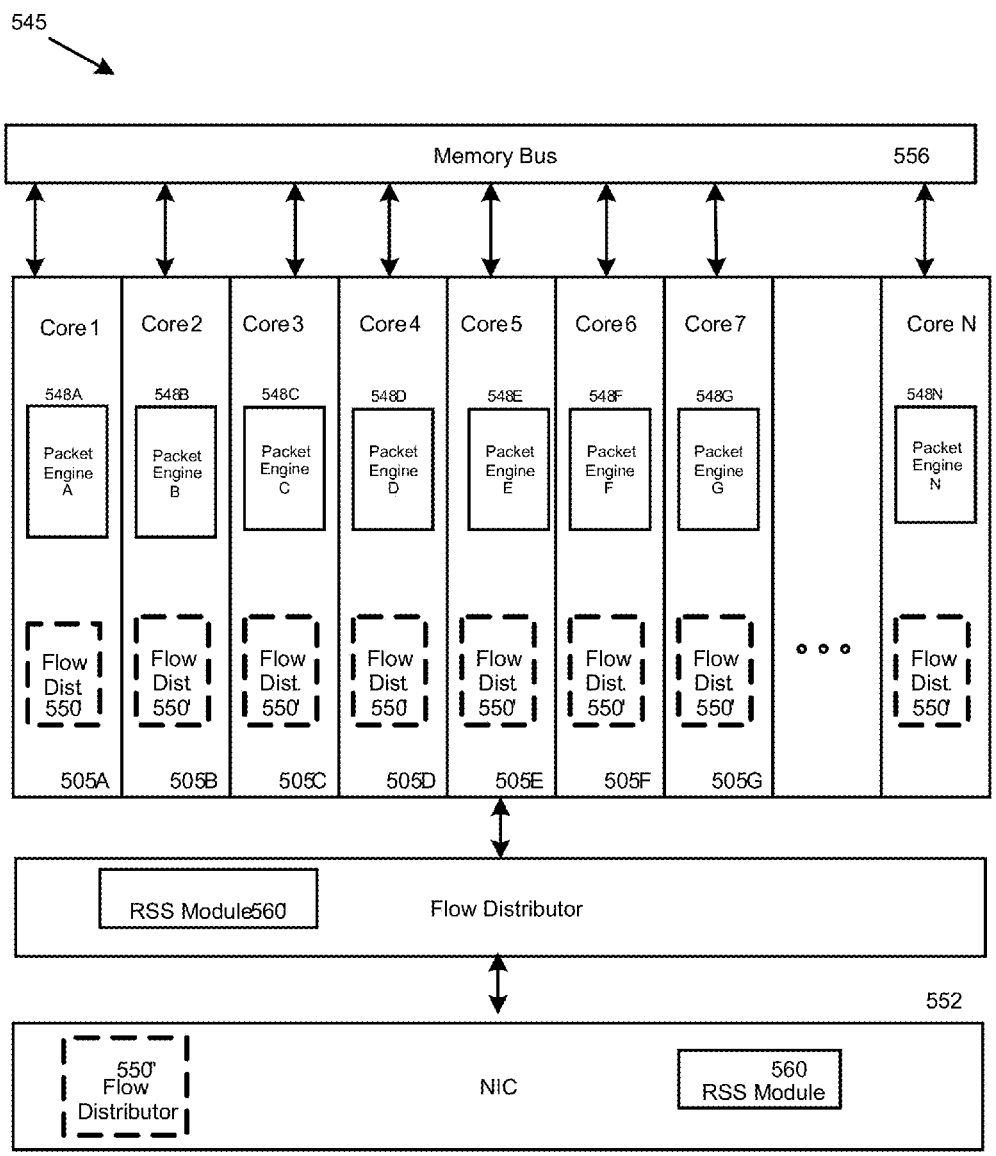
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any embodiment of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments, the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.
  4-tuple of source TCP Port, source IP version 6 (IPv6) address, destination TCP Port, and destination IPv6 address.
  2-tuple of source IPv4 address, and destination IPv4 address.
  2-tuple of source IPv6 address, and destination IPv6 address.
  2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. ny portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
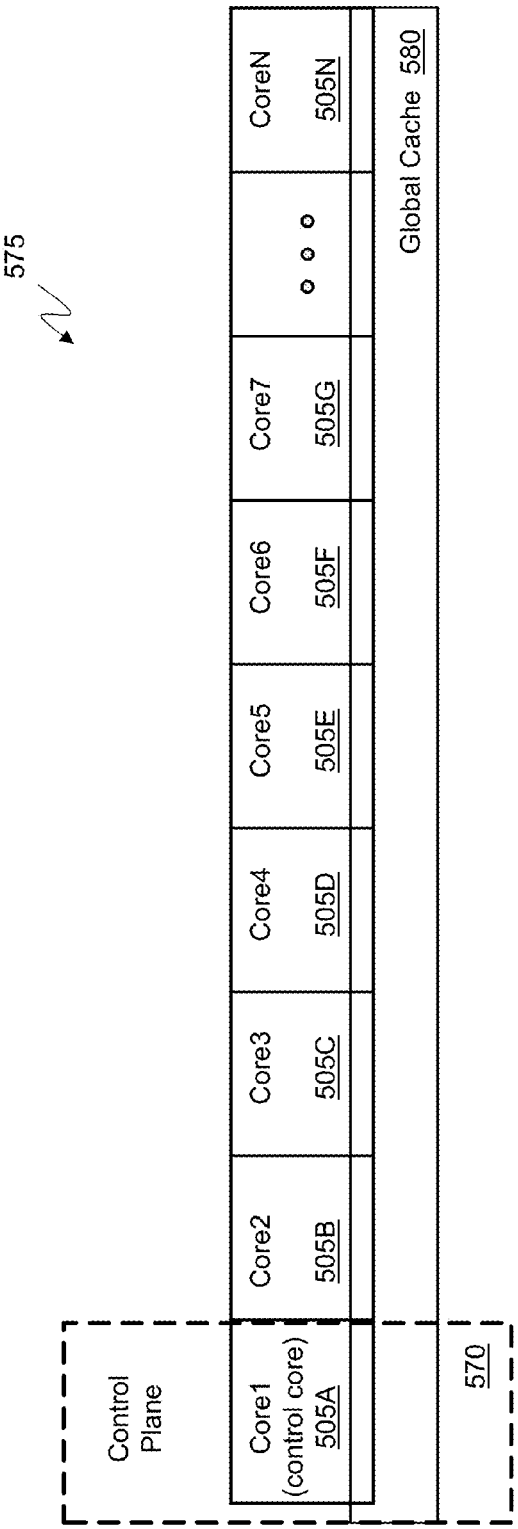
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Policy Based Cache Redirection to WAN Optimization Devices

Figure 6A:
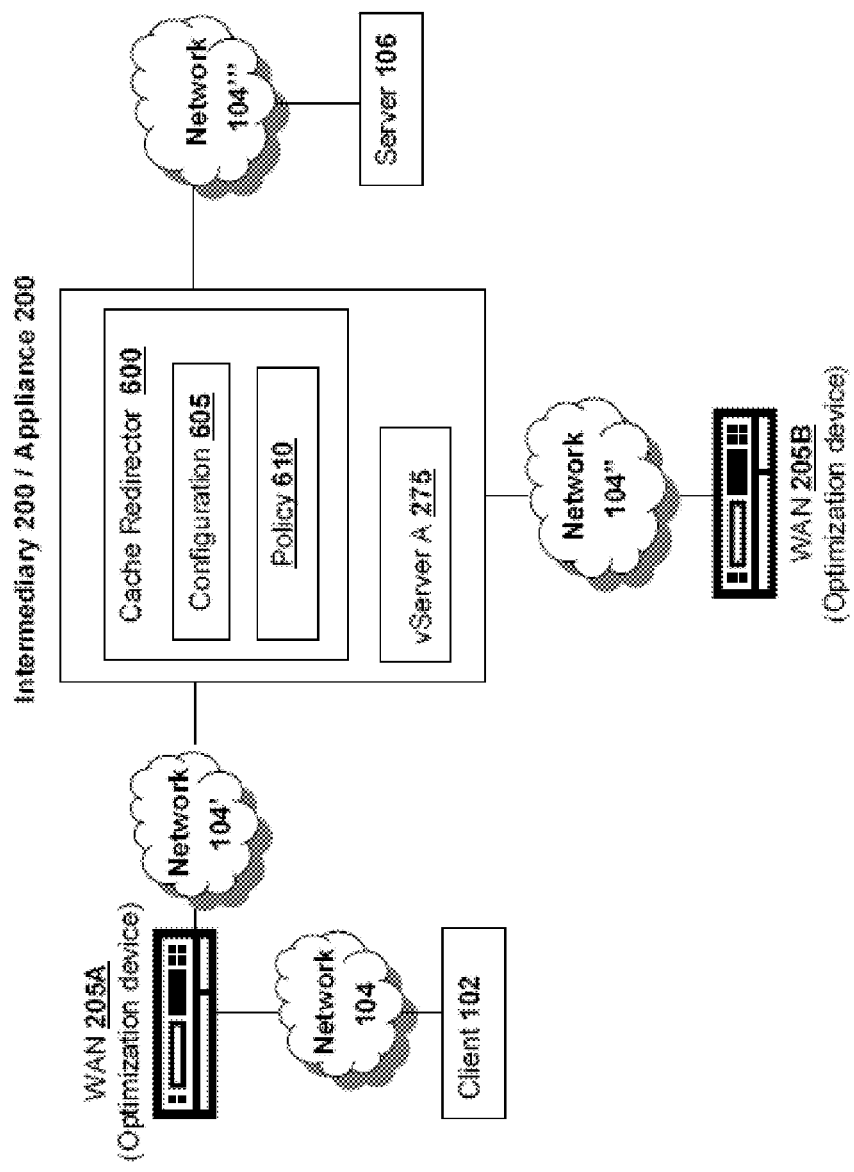
FIG. 6A is a block diagram of an embodiment of a system for performing redirection of network packets by an intermediary device to a horizontally deployed WAN optimization device.

Referring now to FIG. 6A, an embodiment of a system for redirecting client requests by an intermediary device to horizontally deployed Wide Area Network (WAN) optimization devices providing service to the redirected client requests. In brief overview of FIG. 6A, an intermediary device, also referred to as an intermediary 200 or appliance 200, is deployed between a client 102 and a server 106. Intermediary 200 may include a cache redirector 600 which may further include a configuration 605 and a policy 610. Intermediary 200 may also comprise a virtual server 275 for handling the network traffic traversing the intermediary 200. A client 102 may communicate with a WAN device 205A via a network 104. WAN device 205A may be in a communication with the intermediary device 200 via a network 104'. Intermediary 200 may also be in communication with another WAN device 205B via a network 104" and a server 106 via a network 104'. In some configurations, any of the client 102, server 106, intermediary 200 and WAN device 205 may be operating within a same or a different network, such as for example, the network 104.

In some aspects, FIG. 6A corresponds to an embodiment of a system in which client 102 sends a request destined for a server 106. WAN device 205A may intercept the client request and perform some services or operations to the request, such as any optimization, functionality or security services and operations. Some such services may entail that two or more WAN devices 205 service operate or service the same request before the request is sent to the server 106. WAN device 205A may modify the request to include an information or a feature that indicates that a WAN device 205 has performed an operation on the request. In some embodiments, client request is modified to identify the operation or service completed. Intermediary 200 may receive the request transmitted by the WAN device 205 and prior to forwarding the request to the destination server 106, identify that the request was previously serviced by a WAN device 205A. Cache redirector 600 of the intermediary 200 may determine that the client request should be forwarded to a WAN device 205B so that the operation or service performed by the first WAN device 205A be completed. WAN device 205B may be deployed horizontally to the intermediary 200, and therefore not in line with the WAN device 205A, server or client. For example, the second WAN device 205B may not be in the path of network traffic from the client to server, the client to the intermediary and/or the intermediary to server. In some embodiments, the intermediary and WAN device 205B are in line or on the same network path different from the network path the intermediary may have with either the client or server. In some embodiments, the WAN device 205B may be on a different network segment than the client and/or server.

WAN device 205B may be used by intermediary 200 to complete operations or functions started or initiated by other WAN devices 205, such as WAN device 205A. WAN device 205B may receive the client request and identify the service or the operation to be implemented on the network packet. In some embodiments, WAN device 2005B modifies the request to include an information or a feature that indicates that the operation started by WAN device 205A has been completed by WAN device 205B. Cache redirector 600 of the intermediary 200 may receive the request from WAN device 205B and determine that the request is ready to be forwarded to the destination server 106. Cache redirector 600 may then forward the request to any other component of the intermediary 200, such as the virtual server 275 or to the destination server 106.

In addition to aforementioned embodiments, Wide Area Network optimization device 205, or WAN device 205, may be any intermediary component, device, function or a unit performing an operation or a service on a network packet, such as a client request or a server response. WAN device 205 may include any functionality of any intermediary 200 or intermediary 205. In some embodiments, WAN device 205 includes a packet engine 548, a cache manager 232 and a policy engine 236. WAN device 205 may also include a multi-protocol compression 238, an integrated packet engine 240 and a network stack 267. WAN device 205 may include a virtual server 275, an acceleration 288, an SSL VPN 280, a monitoring agent 197, an acceleration program 302 and a streaming client 306. In some embodiments, WAN device 205 includes a client agent 120 and/or service 270.

WAN device 205 may perform any acceleration, optimization or security service or operation on a network packet. In some embodiments, WAN device 205 accelerates transmission of network packets between a client 102 and server 106 by compressing and decompressing network packets. In some embodiments, WAN device 205 performs encryption and/or decryption of a network packet. A WAN device 205 may operate with another WAN device 205 as a pair to complete a single function. For example, a WAN device 205A may compress a network packet and a WAN device 205B may decompress the same network packet. Similarly, a WAN device 205A may encrypt a network packet and a WAN device 205B may decrypt the same network packet. In some embodiments, a plurality of WAN devices 205 share a compression history used to compress one or more network packets for accelerated transmission over a wide area network. WAN devices 205A and 205B may share an encryption key, thereby being only network devices capable of completing each other's tasks.

WAN devices 205 may modify or edit any network packet. In some embodiments, WAN device 205 modifies a format or the size of the network packet. In some embodiments, WAN device compresses a network packet. In some embodiments, WAN device decompresses a network packet. In some embodiments, WAN device 205 modifies an option field of a network packet, such as a transport layer option field. In some embodiments, WAN device 205 modifies a header of the network packet. In further embodiments, WAN device 205 modifies a body of the network packet. WAN device may modify an HTTP header of a network packet or any information at any network layer stack.

In addition to aforementioned features, virtual server 275 may include any feature or functionality to aid in network packet redirection or forwarding by a cache redirector 600. In some embodiments, virtual server 275 performs load balancing of the network packets received by the cache redirector 600. In further embodiments, virtual server 275 implements functions or instructions requested by the cache redirector 600, which may include forwarding of the network packets in accordance with cache redirector 600 instructions. In some embodiments, virtual server 275 forwards network packets, such as the client requests or server responses to the destinations to whom the network packets were originally sent. In some embodiments, virtual server 275 forwards a client request received from a cache redirector 600 to a server 106. In some embodiments, virtual server 275 forwards a server response received from a cache redirector 600 to a client 102.

Cache redirector 600 may comprise any hardware, software or any combination of hardware and software for redirecting, forwarding or managing network packets received by the intermediary 200. Cache redirector 600 may comprise any and all functionality of a virtual server 275 or a backup virtual server 276. In some embodiments, cache redirector 600 includes a virtual server 276. Cache redirector 600 may include any logic circuits, processors, functions, programs, algorithms or components that alone, or in combination, provide functionality for redirecting or forwarding the network packets traversing intermediary 200. Cache redirector 600 may include functionality to determine which network packet to forward to which outside network device. For example, cache redirector 600 may include functionality to distinguish between a network packet that is to be forwarded to a destination server 106 from a network packet that is to be forwarded to a WAN device 205. Cache redirector 600 may include policies and configurations to determine where each network packet will be forwarded.

Cache redirector 600 may comprise any information about any WAN device 205. In some embodiments, cache redirector 600 includes information about WAN device 205A and WAN device 205B. Information about the WAN device may include any relevant information, such as proximity to the intermediary 200, configuration with other WAN devices 205 and configuration with the intermediary 200. In some embodiments, cache redirector 600 includes information about WAN device 205 that is deployed horizontally to intermediary 200 in reference to other WAN devices 205. For example, cache redirector 600 may include information about a WAN device 205 to whom to forward a client request that has been compressed or encrypted by a WAN device 205 comprising a compression history. The horizontally deployed WAN device 205 may be the closest, most convenient and/or fastest resolution for decompression or decryption of the network packet. Cache redirector 600 may send to the horizontally deployed intermediary 200 the network packets that need to be serviced or operated on by a WAN device 205 prior to being forwarded to the intended destination, such as a client 102 or server 106.

Cache redirector 600 may include functionality to forward, redirect and/or manage any network packet, such as a client request, a server response, or any other data or communication traversing the cache redirector 600. Cache redirector 600 may forward or redirect any request of a client or a response of a server previously modified, edited, compressed or encrypted by a WAN device 205. In some embodiments, cache redirector 600 communicates, redirects, receives or forwards network packets to and from any network devices or environments, such as other appliances 200, WAN devices 205, application servers, proxies, routers, virtual servers 275, other clients 102 or servers 106. Cache redirector 600 may include functions, algorithms, configurations and policies for establishing, terminating, controlling or managing any connections with another WAN device 205. Cache redirector 600 may modify, edit or rewrite any portion of a network packet, such as for example a header or a body of the network packet. WAN device 205 may edit an option field of a network packet, such as an option field at a transport layer of a network packet. In some embodiments, cache redirector 600 modifies or edits a client request redirected or forwarded to a cache server, WAN device 205, or any other network device. Cache redirector 600 may modify any portion of the request, such as an internet protocol address, media access control address, port identifier or any other portion of the request or response.

Cache redirector 600 may comprise functionality to identify any change incurred on a client request or a server response by a WAN device 205. In some embodiments, cache redirector 600 identifies that a header of a network packet includes a flag, a marker or an information identifying that an operation has been performed by a WAN device 205. In further embodiments, cache redirector 600 identifies that an option field of a transport layer of a network packet includes a flag, a marker or an information which may be used to identify an operation that was performed by WAN device 205. Similarly, cache redirector 600 or the WAN device 205 may include functionality to use the flag, the marker or the information to identify that the network packet should be forwarded to another WAN device 205 for another operation to be performed. In some embodiments, cache redirector 600 uses an information from an option field to identify that a network packet is to be sent to another WAN device 205 so that decompression, decryption or a second portion of any operation or service is to be performed by WAN device 205. Cache redirector 600 may include information, settings, configurations or features to identify the appropriate destination WAN device 205 to complete a service started by a previous WAN device.

Cache redirector 600 may be configured to include any feature functionality to support any type and form of protocol or system configuration. In some embodiments, cache redirector is configured to support HTTP and TCP-based protocols. In some embodiments, cache redirector 600 is configured for TCP-based protocols, IP based protocols or any protocols of communication at any level of the network stack. In some embodiments, cache redirector 600 is further configured to support any other additional protocols of requests or responses that may traverse intermediary 200. Cache redirector 600 may include one or more configurations 605 which may identify particular modes of operation for redirecting or forwarding the network traffic. Configurations 605 may include, or work in conjunction with one or more policies 610 to identify which actions to be performed for a particular network packet. In some embodiments, cache redirector 600 may be configured to forward the network traffic having a particular feature, information, setting, format or detail to a particular network device, such as a WAN device 205 or a server 106. Cache redirector 600 may also include a configuration set to operate in a mode for forwarding a network packet in accordance with a feature of a header or a content of the payload of the network packet. Cache redirector 600 may be include a policy 610 or a rule to forward a network packet to a virtual servers 275 or to a server 106. Cache redirector 600 may be configured to perform any actions or operations based on any number configurations 605 and/or policies 610.

Configuration 605 may include any type and form of parameter, setting or instruction for identifying, activating or triggering redirection of network packets, such as client requests or server responses. In some embodiments, configuration 605 includes settings, instructions or parameter for triggering policies 610 or rules for identifying which network packets are to be forwarded to a WAN device 205 and which to a destination client 102 or server 106. Configuration 605 may triggering operation for redirecting requests to an internal intermediary 200 component, such as a virtual server 275 or a packet engine 548. Configuration 605 may include a parameter, a setting, a function, an instruction, a character, a string or a command. Configuration 605 may be stored in any memory location of an intermediary 200. In some embodiments, configuration 605 is stored within one or more instructions for managing network packet forwarding or redirection by intermediary 200. Configuration 605 may be connection based, session based, client 102 based, server 106 based or based on any configuration by a user or an administrator. Configuration 605 may be set or configured for all network packets transmitted via a particular connection, a particular session, from a particular client 102 or a user on the client 102 or transmitted in connection with a particular server 106. In certain embodiments, configuration 605 is preconfigured or preset by a user. Configuration 605 may be installed on intermediary 200 in accordance with a setting for a policy 610. In some embodiments, configuration 605 is received from a client 102 or a server 106 to specify forwarding of particular client requests and server responses by one or more WAN devices 205. Similarly, configuration 605 may specify handling of a client request or a server response by a cache redirector 600 to determine which network packets to forward to WAN devices 205 and which network packets to forward to the intended destination device, such as the client 102 or server 106.

Configuration 605 may comprises information, policies or rules to direct the identification of network packets that have been previously serviced or operated on by a WAN device 205. In some embodiments, configuration 605 includes policies 610 or rules that distinguish a network packet that was serviced by a WAN device 200 once from a network packet that was serviced by a WAN device 205 twice. For example, configuration 605 may include policies 610 for identifying that a network packet has been compressed by a WAN device 205. Configuration 605 may identify a compressed network packet from an information stored in an option field of a header of the network packet. In some embodiments, configuration 605 identifies that a network packet has been operated on by a WAN device 205 by reading an information stored in a portion of the network packet, such as a header or an option field. In some embodiments, configuration 605 identifies that a network packet has been compressed, encrypted or otherwise modified by a WAN device 205 by identifying a particular flag, setting or a marker in a portion of the network packet, such as an option field of a transport layer of the network packet.

Configuration 605 may trigger or identify a set of policies or instructions for operations to be performed to the network packets being forwarded or transmitted between intermediary 200 and a particular WAN device 205. In some embodiments, configuration 605 includes an information identifying or triggering an operation to forward to a particular WAN device 205 a network packet that includes a particular feature included or written into the network device by another WAN device 205A. In some embodiments, the feature of the network packet may include a feature or a property of any network layer of the request, including an IP address, a media access control address, a port identifier. The feature triggering the configuration 605 may also include an IP feature, a TCP feature, an HTTP feature, an HTML feature, a particular format or a type of the request or any other feature or property identifiable by intermediary 200 or WAN device 205. In some embodiments, configuration 605 identifies a policy 610 that identifies a set of rules or instructions identifying which network packets to forward to which WAN device 205. In further embodiments, configuration 605 identifies a policy 610 that identifies a set of rules or instructions identifying which network packets to forward to a particular virtual server 275, client 102 or server 106.

A configuration 605 of a cache redirector 600 of the intermediary device 200 may further include settings or expressions for deciding which network packets to be forwarded to a WAN device 205 and which network packets to be forwarded to a virtual server 275 of the intermediary 200. Configuration 605 may include expressions and settings for implementing policy based forwarding of network requests to horizontally deployed WAN optimization devices 205.

A configuration 605 of the cache redirector 600 may include instructions or code, such as the following:

enable ns mode USIP
add service SVC_BR_1 ip1 TCP port1-cacheType TRANSPARENT
add 1b vServer LB_BR_1-m MAC
bind 1b vServer LB_BR_1 SVC_BR_1
add 1b vServer V1 ip http 80-cacheable ON
add cr vServer CR1 TCP * *-type TRANSPARENT-cacheVServer LB_BR_1

The expression "SVC_BR_1" may include an internet protocol address of a WAN device 205 to whom the request is forwarded. Expression "Lb vServer V1" may identify a virtual server 275 to whom the client 102 sends the request. Virtual server 275 may be configured to include caching. In some embodiments, configurations 605 may include one or more policies to determine which network packets are forwarded to WAN devices 205 based on TCP features.

Policy 610 may provide any policy or one or more rules for cache redirector 600 for forwarding or redirecting a network packet to a particular network device, such as a WAN device 205, client 102 or server 106. Policy 610 may provide any policy or one or more rules for cache redirector 600 to determine which network packets are to be forwarded to a WAN device 205 and which to be forwarded to a server 106 or client 102. In some embodiments, policy 610 comprises policies or rules to forward or redirect a network packet to a virtual server 275 of the intermediary 200. Policy 610 may include or identify a set of rules or tasks for determining that a network packet received by a network device has been compressed or otherwise modified by another WAN device 205. In some embodiments, policy 610 provides rules and tasks for forwarding a network packet to a WAN 205B if the network packet has been serviced by WAN 205A. Similarly, policy 610 may include rules and tasks for forwarding a network packet not serviced by a WAN device 205 to a destination network device identified by the destination IP address of the network packet, such as the server 106 or the client 102. Policy 610 may further identify or provide a set of rules or tasks for identifying a particular WAN device 205 to which the network packet will be forwarded. In some embodiments, policy 610 may provide rules or tasks for identifying an operation or service to be performed on the network packet by the WAN device 205 to whom the request is forwarded by intermediary 200. Policy 610 may include any functionality for instructing the WAN device 205 or the cache redirector 600 to modify a network packet accordingly so that cache redirector 600 may correctly forward or redirect the network packet upon receipt.

The intermediary device 200 and/or WAN device 205 may include any embodiment of a policy engine 236 or 195 as previously described herein. The policy engine may operate on or execute any one or more policies. Policy 610 may include any configuration or information for maintaining IP address of a network packet, such as a policy for a CR vServer, or a cache redirector virtual server. Policy 610 may comprise an algorithm, an executable, an instruction code, a computer program, a configuration, a command or a directive. Policy 610 may be stored in memory of the intermediary 200 or cache server 620. In some embodiments, policy 610 includes a rule identifying or providing a set of instructions to be implemented by the cache redirector 600 or the cache server 620. The set of instructions identified or provided by the policy 610 may be for forwarding or redirecting network packets that were previously serviced by a WAN device 205A to another WAN device 205B. In some embodiments, the set of instructions are for determining that the network packet has been serviced by two WAN devices 205 and that no further operations by WAN devices are necessary. In further embodiments, the set of instructions are for forwarding the network packet to the virtual server 275 for further processing, such as load balancing or forwarding to the server 106.

Figure 6B:
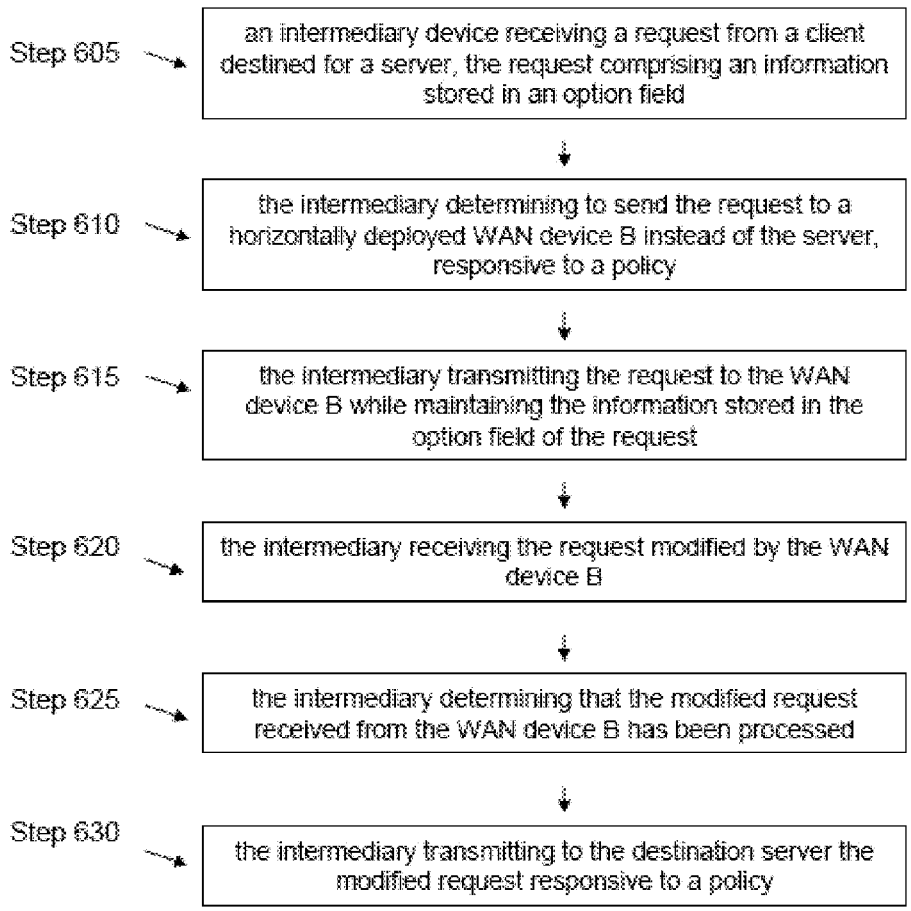
FIG. 6B is a flow diagram of an embodiment of steps of a method for performing redirection of network packets by an intermediary device to a horizontally deployed WAN optimization device.

Referring now to FIG. 6B, an embodiment of steps of performing a policy based redirection of network packets by an intermediary device to a horizontally deployed WAN device. At step 605, an intermediary device receives a request from a client destined for a server, the request comprising an information stored in an option field. At step 610, the intermediary device determines to send the request to a horizontally deployed WAN device B instead of the intended server, in response to a policy of a cache redirector. At step 615, the intermediary device transmits the request to the WAN device B, while maintaining the information stored in the option field. At step 620, the intermediary receives the request modified by the WAN device B. At step 625, the intermediary determines that the modified request received from the WAN device B has been processed by the WAN device B. At step 630, the intermediary device transmits to the destination server the modified request, such as responsive to a policy.

At step 605, an intermediary device receives any network packet from any source network device destined to any destination network device. The network packet may include information stored in an option field, such an optional field of TCP layer or IP layer of the packet. In some embodiments, an intermediary device 200 receives a request from a client 102 destined to a server 106. In other embodiments, the intermediary device 200 receives a response from a server 106 to a client request, the response destined to the client 102. Intermediary device 200 may receive the network packet comprising any information about the network packet stored in a header of the network packet. In some embodiments, intermediary device 200 receives a network packet comprising a flag or a marker stored in an option field. In some embodiments, the flag, the marker or any information stored in the option field of a transport layer portion of the request or the response. The flag, the marker or any information in the option field may be entered into the option field by a WAN device 205. The information in the option field may be processable by a WAN device 205. The information in the option field may indicate that a WAN device 205 has compressed the network packet. In some embodiments, the information stored in the option field indicates that a WAN device 205 has encrypted the network packet. The information stored in the option field may identify the first WAN device 205 operating on the network packet to any subsequent WAN device 205 that may receive the network packet in the future. In some embodiments, the information stored in the option field may identify information on processing a payload of the network packet for any subsequent WAN device 205 that may receive the network packet in the future. The information stored in the option field may indicate that the network packet has been compressed using a particular compression history. The information stored in the network packet may also identify a particular compression history used in compressing the network packet. The information stored in the network packet may identify an information used by WAN devices 205 to decompress or decrypt the compressed or encrypted network packet. In further embodiments, the information stored in the option field indicates that the network packet needs to be serviced by another WAN device 205 before being forwarded to the destination network device, such as the destination server 106 or destination client 102.

At step 610, the intermediary device determines to send the network packet to a WAN device B instead of the destination network device and may make the determination responsive to a policy. The intermediary device 200 may determine to redirect the network packet to a WAN device B that is horizontally deployed to the intermediary device 200. WAN device B may be identified by a cache redirector 600 as a WAN device B most appropriate to receive and service the client requests and/or server responses sent by the intermediary 200. In some embodiments, a cache redirector 600 determines to redirect the network packet. A cache redirector 600 may determine to redirect a client request to a WAN device B instead of the destination server 106. In some embodiments, a cache redirector 600 determines to redirect a server response to a client request to WAN device B instead of the destination client 102. A cache redirector 600 of the intermediary device may determine to send the network packet to the WAN device B in response to a redirection policy 610 that identifies a presence of the information stored in the option field. A cache redirector 600 may determine to send the network packet to the WAN device B in response to evaluating an expression of the redirection policy to the first option field, or concerning the first option field. In some embodiments, intermediary identifies a particular WAN device B out of a plurality of horizontally deployed WAN devices to send the network packet to, in response to a portion of the information stored in the option field. The portion of the information may identify a particular feature or a characteristic of the WAN device B, such as a configuration, a compression history, an encryption key. In some embodiments, the portion of the information identifying WAN device B includes a unique identifier of the WAN device B, such as an IP address, a MAC address, a port or a connection between the intermediary 200 and the WAN device B. The policy for redirecting to the WAN device may be based on any arrangement and/or format and/or content of the request that may be used to identify that WAN device A processed the request.

At step 615, the intermediary device transmits the network packet to the WAN device B, while maintaining the information stored in option field of the network packet. In some embodiments, the intermediary generates a second network packet or request to send to WAN device B. In some of these embodiments, the intermediary copies the option field information from the first request or packet to the generated second request or packet. In other embodiments, the intermediary modifies the network packet or first request to put in a form for sending to WAN device B. In some embodiments, cache redirector 600 of the intermediary device transmits the client request to the WAN device B while maintaining the information stored in the option field of the network packet. In other embodiments, cache redirector 600 transmits the server response to the client request to WAN device B while maintaining the information stored in the option field of the network packet. The information stored in the option field may identify for WAN device B that WAN device A has previously serviced the network packet. The information stored in the option field may further indicate to WAN device B information about the service previously performed by WAN device A, such as for example compression using a particular compression history. WAN device B may utilize the information stored in the option field to identify services or operations needed to be performed on the network packet. In some embodiments, the intermediary device establishes a transport layer connection between the intermediary device 200 and the WAN device B. The connection may be established to the WAN device B out of a plurality of available horizontally deployed WAN devices. In some embodiment, intermediary device 200 forwards the network packet to the WAN device while forwarding the information from the option field separately. In some embodiments, intermediary device 200 forwards the network packet and instructions about handling or servicing of the network packet. The instructions may have been produced by the cache redirector 600 in response to a set of configurations 605 and/or policies 610 executed based on the information stored in the option field.

At step 620, the intermediary 200 receives the network packet modified by the WAN device B. In some embodiments, the network packet is received via a new connection established between the WAN device B and the intermediary 200. In some embodiments, the modified network packet includes a client request modified by WAN device B. In other embodiments, the modified network packet includes a server response modified by WAN device B. The modified network packet may include a decompressed network packet. In some embodiments, the modified network packet includes a decrypted network packet. In further embodiments, the modified network packet is serviced or modified by WAN device B to be ready to be received by the destination network device, such as a destination client 102 or a destination server 106. Intermediary 200 may receive the network packet that was modified by the WAN device B may to include the information included in the option field at step 605 into another option field of the network packet. The information in the other option field of the network packet may comprise a flag or a marker indicating that WAN device B has completed operation, such as decompression or decryption of the network packet. In some embodiments, the modified network packet includes the information in the option field modified by WAN device B to indicate that the network packet has been processed by WAN device B. In some embodiments, the modified network packet is modified so that it is in a format that is different from a format of the network packet at step 605. In further embodiments, the modified network packet comprising a client request is modified by the WAN device B to be similar or same as the client request before being processed by WAN device A. In still further embodiments, the modified network packet comprising a server response is modified by the WAN device B to be similar or same as the server response before being processed by WAN device A.

In some embodiments, the WAN device B performs processing on the request or packet to put the request back in the same form as was transmitted from the client before WAN device A processed the packet. For example, client may transmit a request that is compressed by WAN device B using a compression history. WAN device B may uncompress the compressed request using its compression history and provide back to the intermediary the request as was sent by the client.

At step 625, the intermediary device 200 determines that the modified network packet received from the WAN device B has been processed by the WAN device B. In some embodiments, cache redirector 600 of the intermediary 200 determines that the information stored in the option field has been modified. Cache redirector 600 may determine that the information stored in the option field has been modified to indicate that no further processing by a WAN device is necessary. In some embodiments, cache redirector 600 utilizes configurations 605 and/or policies 610 to determine that the information stored in the option field indicates that the modified network packet has been processed by WAN device B. Cache redirector 600 may determine that the modified network packet, such as the modified client request or the modified server response, has been decompressed. In some embodiments, cache redirector 600 determines that the modified network packet has been decrypted. Cache redirector 600 may determine that the modified network packet is decompressed and/or decrypted based on the information stored in the option field of the modified network packet. Similarly, cache redirector 600 may determine that WAN device processing of the network packet is now complete, based on the information stored in the option field.

At step 630, intermediary 200 may transmit to the destination network device the modified network packet and may transit the modified network packet in response to a policy 610. In some embodiments, the cache redirector communications the modified client request received from WAN device B to a virtual Server 175 that manages the service or server for the client request. In some embodiments, the cache redirector performs the redirection to the WAN device B and receiving of the request back from WAN device B transparently to the virtual server. The virtual server 275 may manage or load balance the network traffic being transmitted to the destination device. In some embodiments, cache redirector 600 determines, responsive to configurations 605 and/or policies 610 that the modified network packet, such as the modified client request or the modified server response from WAN device B, is to be forwarded to the destination device. In some embodiments, the intermediary receives the client request from WAN device B and responds to the client based on content stored in the cache of the intermediary device. In some embodiments, cache redirector 600 determines, based on configurations 605 and/or policies 610 that the modified network packet does not need to be forwarded to a WAN device. In response to such determination, cache redirector 600 may forward the network packet to a destination server 106 or a destination client 102. In some embodiments, intermediary 200 transmits a client request to a destination server 106 directly and bypassing WAN device B.

G. Systems and Methods for Using a Listening Policy for a Virtual Server on an Intermediary Device The systems and methods of the solution described herein are directed towards using listening policies for virtual servers executing on an intermediary device. As the virtual servers manage connections between clients and backend servers, each virtual server may include an internet protocol (IP) address and port that is broadcast to the clients 102. As one or more virtual server may be responsible for connections to a particular server, multiple virtual servers may include the same IP address and port. When a client specifies an IP address and port serviced by multiple virtual servers, the intermediary device must select a virtual server for the connection. As a result, the appliance may use policies that distinguish among the vServers 275 for the purpose of controlling and managing the flow of network traffic and communication sessions between the clients 102 and the vServers 275.

In some embodiments, the virtual servers may execute on the cores of the multi-core system described above. In various embodiments, a single core may execute a virtual server or a plurality of the virtual servers. In some embodiments, virtual servers with the same IP address and port may be executed on the same core, and in other embodiments, these virtual servers may each be executed on a different core. The allocation of virtual servers for execution on the cores of the system may be determined according to any method as would be appreciated by one of ordinary skill in the art.

Figure 7A:
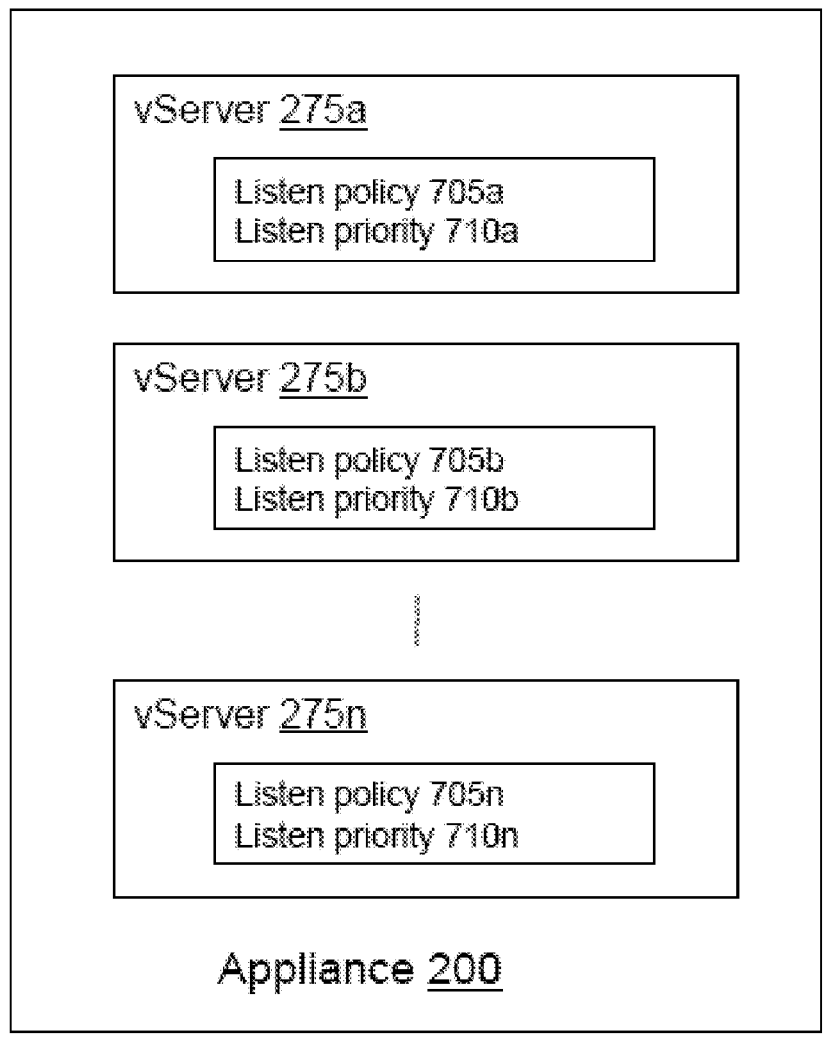
FIG. 7A is a block diagram of a system for using a listening policy for a virtual server, such as a load balancing vserver, operating on an intermediary device 200.

Referring now to FIG. 7A, an embodiment of a system for using a listening policy (also referred to as a "listen policy") for a virtual server (also referred to herein as a "vServer") on an intermediary device (e.g., an appliance 200) is depicted. Any of the functionality and/or embodiments of the appliance 200 (e.g., an application delivery controller) described above in connection with FIGS. 2A and 2B may be deployed in any embodiment of the system described in connection with FIG. 7A.

The appliance 200 may bind listening policies and/or listening priorities to the vServers 275 (also referred to herein as "establishing policies or priorities" for the vServers). Although a routing protocol may broadcast a vServer's IP address, port, service and/or transport type to all the clients 102, a client 102 may only access a vServer 275 if the client 102 satisfies the vServer's 275 listening policy. If a client 102 satisfies the listening policies of multiple vServers 275, the appliance 200 may connect the client 102 with the vServer 275 with the highest listening priority. If the client 102 does not satisfy the listening policies of any vServer 275 and the appliance 200 lacks a vServer 275 that accepts any clients 102 (i.e., a catch-all vServer), the client 102 does not receive any service.

A listening policy 705 may comprise any type and form of policy that directs, determines or controls which network packets are received and processed by which listening process of a device. The listening policy may include a policy expression (also referred to herein as a "rule") to evaluate against packets, such as packets from clients 102 and any contents within the packet. The policy expression may be based on any content of the communication with clients 102, such as virtual local area network (VLAN) identifier, internet protocol (IP) address, port, protocol type, header or fields in a packet, packet interface, interface identifier, or any combination thereof. For example, a policy expression of "CLIENT.V-LAN.ID==7" may permit only clients with a VLAN identifier of 7 to access the vServer 275. In another example, a policy expression of CLIENT.INTERFACE.ID.EQ("½") may permit only clients whose interface identifier is "½" to access a vServer 275. If a vServer 275 is not bound to a listening policy 705, then the vServer 275 becomes a "catch-all" vServer 275 that any client 102 may access.

A listening priority may comprise any type and form of indicator or identifier for determining which of a plurality of listening processes, such as a vServer, has priority over another process in processing network packets matching multiple listening policies. Via listening priorities 710, the appliance 200 can distinguish between vServers 275 with listening policies 705 that may evaluate to or match the same packet. A listening priority may be an integer value. For example, an appliance 200 may set a listening priority 710 to a value between 0 and 100, and the priority 710 may default to a value outside the range. In these embodiments, lower priority values may indicate higher priority. In other embodiments, the listening priority may comprise any type of string or alphanumeric text for identifying one priority over another priority of a plurality of priorities or range of priorities.

The listening priority (also sometimes referred to as a "listen priority") may be established or changed at any time. In some embodiments, the listening priority may be set at the time the listening policy is set or established. The appliance 200 may set a listening priority 710 when the appliance 200 binds a vServer 275 to a listening policy 705. If the appliance 200 does not set the priority 710 at this time, the priority 710 may default to a value of 101. Therefore, vServers 275 without set priorities will have lower priority than vServers 275 whose priorities the appliance 200 has set. Nevertheless, the appliance 200 may subsequently adjust the priority 710 of a vServer 275 after binding the vServer 275 to a listening policy. Further, before the appliance 200 binds a vServer 275 to a listening policy 705, the vServer's 275 priority may default to 255. In this manner, any vServer 275 with a listening policy 705 will have higher priority than a catch-all vServer 275.

The appliance 200 may bind a vServer 275 to a listening policy and/or set the priority of the vServer 275 using any type or form of command, such as CLI commands. For example, the appliance 200 may first create a policy expression and subsequently, bind the expression to a vServer 275 and/or set the listening priority. These commands may take forms such as:

add expression e1 "CLIENT.VLAN.ID==5"
    add 1b vs LB1 http 10.102.27.189 80-listenpolicy e1-listenpriority 5

In more examples, the appliance 200 may directly bind the policy expression to the vServer 275:

add cs vs CS1 http 10.102.27.189 80-listenpolicy "CLIENT.VLAN.ID==7"

In further examples, the appliance 200 may transform a vServer 275 into a catch-all vServer 275 by removing any listening policies from the vServer 275:

set 1b vs LB1-listenpolicy "None"

Lastly, the appliance 200 may adjust the priority of a vServer 275 by setting the priority to a different value. In the following example, the command sets vServer LB1 to have the highest priority among all vServers 275 with the same listening policy:

set 1b vs LB1-listenpriority 1

In some embodiments, the appliance 200 may not revert the listening policies and/or priorities of vServers 275 to previously held expressions or values, thereby "unsetting" the same. However, the appliance 200 may adjust the policies or priorities by resetting vServers 275 to different expressions or values. In other embodiments, the appliance 200 may support such "unset" commands.

Further, the appliance 200 may support "show" commands that display the listening policies and/or priorities of vServers 275. For example, if an appliance 200 receives a command such as the following:

show 1b vs LB1-listenpolicy-listenpriority the appliance 200 may return "CLIENT.VLAN.ID==5" for the listening policy and "5" for the listening priority. Such commands may be adjusted to elicit only the policy expression or the priority of the vServer. Further, the "show" command may be used in conjunction with the "set" command to determine the listening policies and priorities of the vServers and to make adjustments accordingly.

In some embodiments, whenever an appliance 200 binds a listening policy 705 to a vServer 275 or sets the listening priority 710 or listening policy 705 of the vServer, the appliance 200 first determines whether a vServer 275 with the same parameters already exists. If a vServer 275 with the same IP address, port, service and/or transport type, and listening priority exists, the appliance 200 does not bind the vServer 275 because doing so would create identical vServers 275 that cannot be distinguished when managing network traffic between the clients 102 and the vServers 275. In these situations, the appliance 200 may return an error.

The system 600 may deploy various types of vServers 275 and combinations thereof in the appliance 200. For example, the system 600 may use generic vServers, ippattern vServers, wildcard vServers, LB servers, CS (Content Switching) vServers, CR (Cache Redirection) vServers, VPN vServers, or any combination thereof. Additionally, the system 600 may use full IP address vServers, wildcard IP address vServers, or any combination thereof.

Figure 7B:
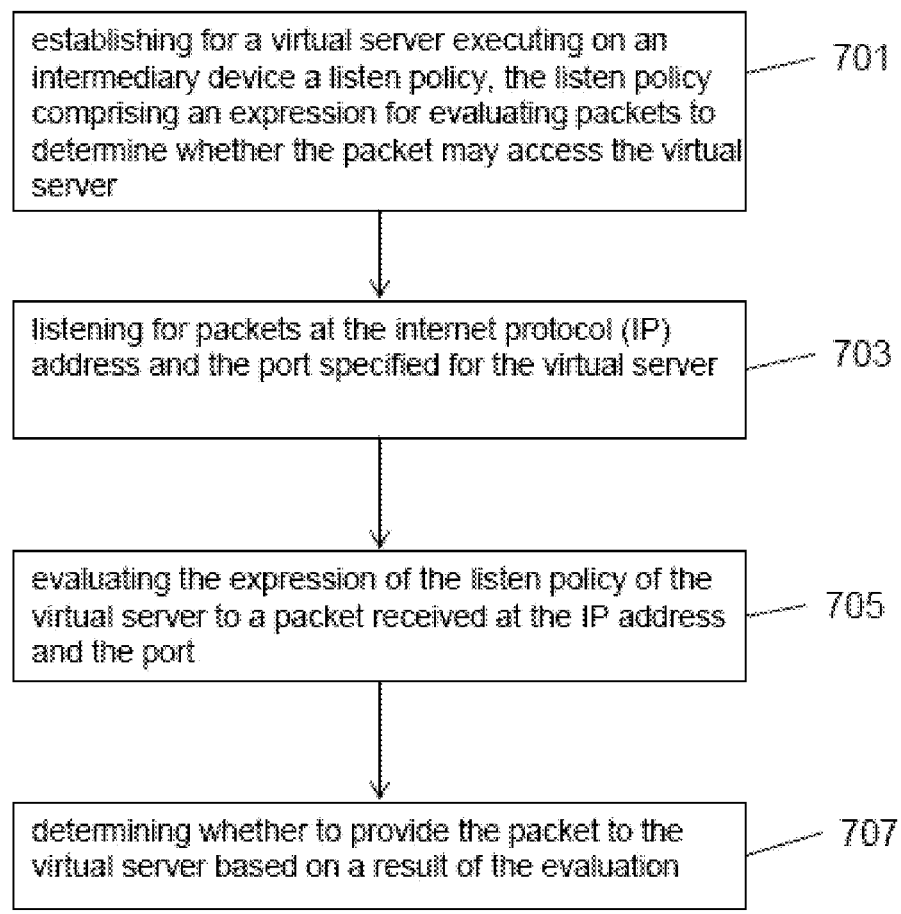
FIG. 7B is a flow diagram of an embodiment of a method for using a listening policy for a virtual server on an intermediary device 200.

Further, the system 600 may prioritize the types of vServers 275 according to any order. In one example, the system 600 may prioritize generic vServers, ippattern vServers, and wildcard vServers in descending order. Generic vServers bound to listening policies will be prioritized above catch-all generic vServers, ippattern vServers bound to listening policies will be prioritized above catch-all ippattern vServers, and wildcard vServers bound to listening policies will be prioritized above catch-all wildcard vServers. In some embodiments, the system 600 may prioritize all bound vServers 275 above all unbound servers 275. In this manner, the priority order of vServers 275 would be:

1. generic vServers bound to listening policies
2. ippattern vServers bound to listening policies
3. wildcard vServers bound to listening policies
4. catch-all generic vServers
5. catch-all ippattern vServers
6. catch-all wildcard vserves In other embodiments, the system 600 may prioritize primarily by vServer type and secondarily by status with respect to bindings to listening policies. Under this manner of prioritization, the order of vServers 275 would be:

1. generic vServers bound to listening policies
2. catch-all generic vServers
3. ippattern vServers bound to listening policies
4. catch-all ippattern vServers
5. wildcard vServers bound to listening policies
6. catch-all wildcard vServers Referring now to FIG. 7B, a flow diagram of an embodiment of a method for using a listening policy for a virtual server on an intermediary device is shown and described. In general overview, the method includes establishing, for a virtual server (e.g., a first virtual server) executing on an intermediary device, a listening policy (e.g., a first listening policy). The listening policy comprises an expression for evaluating packets received by the intermediary device to determine whether a packet may access the first virtual server (step 701). The method also includes listening for packets at an internet protocol (IP) address and a port specified for a virtual server (step 703). The method also includes evaluating the expression of the listening policy of the virtual server to packets received at the first IP address and first port (step 705). The method includes determining whether to provide the packet to the virtual server based on a result of the evaluation (step 707).

Although the method is described as being performed with a single process, it should be understood that the method may be performed with any number of processes, such as processes working concurrently, in parallel, simultaneously and/or sequentially. For example, the appliance 200 may establish a first listening policy for a first virtual server while establishing a second listening policy for a second virtual server. While the appliance 200 listens for packets at a first internet protocol (IP) address and a first port specified for a first virtual server, the appliance may be evaluating the expression of a second listening policy of the second virtual server to a packet received at the second virtual server's IP address and port. Other examples of processes performing the listen policy techniques described herein in parallel, concurrently or otherwise, would be apparent to one of ordinary skill in the art.

Further to step 701, one or more listening policies may be set, configured or established for one or more virtual servers. In some embodiments, one listening policy is configured for each vServer. In some embodiments, multiple listening policies are configured for a vServer. In some embodiments, each listening policy is configured to have a listening priority.

The appliance 200 establishes a first listening policy for a virtual server 275 executing on the appliance 200 (step 701). The first listening policy includes an expression for evaluating packets from clients 102 to determine whether the packets may access the first virtual server 275. As described in reference to FIG. 7A, the policy expression may be based on any content of communication with clients 102, such as the VLAN identifier number, internet protocol (IP) address, port, protocol type, header or fields in a packet, packet interface, interface identifier, or any combination thereof.

In various embodiments, the expression may compare a VLAN identifier of a packet to a predetermined value. For example, an expression such as "CLIENT.VLAN.ID==7" would compare the VLAN identifier of a packet to the value of 7. In many embodiments, the expression may compare an interface identifier of a packet to a predetermined value. For example, an expression such as "CLIENT.INTERFACE.ID.EQ("½")" would compare the interface identifier of a packet to the value of V2.

As previously described in reference to FIG. 7A, the appliance 200 may establish the listening policy for a vServer 275 according to any command, such as CLI commands. Further, the appliance 200 may establish such policies for any type of vServer 275, such as a LB, CS, CR, or VPN vServer. In various embodiments, commands for establishing listening policies for a vServer 275 may conform to the following format:

add [type of vServer] vs [vServer name] [service] [IP address] [port]-listenpolicy [expression]

However, one of ordinary skill may rearrange, remove, or add fields to commands for binding vServers 275 to listening policies. For example, a command may omit the port of the vServer 275 or specify the number of clients permitted to access the vServer 275, as demonstrated by the following additional examples:

add expression e1 "CLIENT.VLAN.ID==5"
add cr vs CR1 http 10.102.27.189-cachetype REVERSE-listenpolicy e1
add expression e1 "CLIENT.VLAN.ID==5"
add vpn vServer VPN1 SSL 10.102.27.90 98-maxAAAUsers 2-downStateFlush ENABLED-listenpolicy e1

In addition, the appliance 200 may establish a listening priority for the virtual server 275. Any of the functionality and/or embodiments of listening priorities 710 described above in connection with FIG. 7A may be deployed in any embodiment of the listening priority. When the appliance 200 establishes the listening priority for a vServer 275, the appliance 200 may first determine if doing so would create a vServer 275 that duplicates the parameters of another vServer 275 (i.e., same IP address, host, listening policy, and listening priority). If the appliance 200 determines that a duplicative vServer 275 would be created, the appliance 200 may return an error. Under this rule, vServers 275 that otherwise exhibit the same IP address, port, and listening policy are nevertheless distinguished by priority.

In the same manner, the appliance 200 may establish a listening policy 705 and/or listening priority 710 for each vServer 275 executing thereon. In some embodiments, the appliance 200 may reserve at least one vServer 275 to be a "catch-all" vServer by setting the vServer's 275 listening policy to "None." In some embodiments, the appliance 200 may periodically change listening policies of the vServers 275 such that a different vServer 275 serves as the "catch-all" vServer at various times.

After the appliance 200 establishes a listening policy for a virtual server 275 executing on the appliance 200, the appliance 200 listens for packets at the internet protocol (IP) address and the port specified for the virtual server (step 703). Any embodiment of a packet engine of the appliance may listen for packets. In some embodiments, the flow distributor described elsewhere herein may listen for packets. In various embodiments, the appliance 200 may listen for packet at the IP address and port specified by the listening policy of a virtual server. The appliance 200 may determine whether the IP address and port of a packet correspond to the IP address and port of the vServer 275. Additionally, the appliance 200 may also determine whether the packet's other parameters, such as service type, match the parameters specified for the virtual vServer 275. Further, the appliance 200 may listen for packets at IP addresses, ports, services, or any other parameter specified for other virtual servers 275.

If the parameters match, the appliance 200 may store the packet for further processing. In various embodiments, the appliance 200 may allocate separate memory spaces for each vServer 275 and store packets according to the vServers 275 that the packets match. If a packet matches multiple vServers 275, in some embodiments, the appliance 200 may store the packet in each memory space corresponding to the matching vServers 275. In other embodiments, the appliance 200 may store the packets with multiple matches in a memory space allocated to such packets before identifying via priority the vServer 275 the packet will access.

If a packet does not match any vServer 275, the appliance 200 may return an error to the client 102 that transmitted the packet. In some embodiments, the appliance 200 may also log an error with an administrative service. The logged entry may identify the client 102 that sent the packet, the error, and/or the time and date of the error. A system administrator may examine the log and identify non-functional activity according to the entries. In response, the administrator may initiate work orders to correct such errors.

After the appliance 200 listens for packets at the internet protocol (IP) address and the port specified for the virtual server, the appliance 200 may evaluate the expression of the listening policy of the virtual server to a packet received at the IP address and port of the vServer (step 705). In some embodiments, the listener for the packet such as the packet engine or flow distributor evaluates the listening policy against network traffic. In some embodiments, a policy engine of the intermediary device, such as that of the packet engine evaluates the listening policy against network traffic. The appliance 200 may evaluate the listening policy's expression and at least one parameter of the packet. For example, the appliance 200 may evaluate the VLAN identifier, interface identifier, or any other parameter of the packet.

The appliance may use the evaluation of the listening policy and/or listen priority to determine which vServer shall service the network traffic. Responsive to the listening policy and/or listen priority, the appliance controls or directs the flow of network traffic to each vServer of a plurality of vServers. If the packet's parameters evaluate to TRUE for the listening policy's expression, in some embodiments, the appliance 200 may grant the packet access to the virtual server 275. In some embodiments, the appliance forwards the packet to the virtual server for processing responsive to evaluation of the listening policy and/or listening priority. In further embodiments, the appliance 200 may refrain from granting access until the appliance 200 evaluates the expressions of the listening policies of other virtual servers to the packet. The appliance 200 may select virtual servers 275 with the same IP address, port, service type, or other parameter as the packet and evaluate those vServers' 275 policy expressions. As a result, the appliance may determine that the packet matches the listening policies of multiple virtual servers 275.

After the appliance 200 evaluates the expression of the listening policy of the virtual server to a packet received at the IP address and the port, the appliance 200 may determine whether to provide the packet to the virtual server based on a result of the evaluation (step 707). In various embodiments, the appliance 200 may determine to provide the packet to a virtual server if the VLAN identifier, interface identifier, or any other parameter of the packet matches a predetermined value in the virtual server's 275 policy expression. If a match is found, the appliance 200 forwards the packet to the virtual server 275.

In various embodiments, the appliance 200 may have determined that the packet matches the listening policies of multiple virtual servers 275. In these embodiments, the appliance 200 may compare the listening priorities of the matching virtual servers 275 to identify the highest priority virtual server. As a result of this comparison, the appliance 200 may determine to forward the packet to another virtual server instead of a first virtual server.

In continued reference to FIG. 7B, examples of using listening policies for virtual servers are herein presented. In one example, a single LB vServer 275 has an IP address of 10.102.27.191, a port of 98, and a service type of "http." As a result, the appliance 200 listens for packets at http://10.102.27.191:98 for this vServer. The appliance 200 may receive a CLI command to bind the LB vServer 275 to the listening policy "CLIENT.VLAN.ID==5" and establish the LB vServer's policy accordingly.

Clients 102a and 102b from VLAN 7 and VLAN 5, respectively, may attempt to connect to http://10.102.27.191:98. As the appliance 200 listens for packets at that location, the appliance 200 may receive packets from both clients. Because one client 102a is from VLAN 7, the listening policy expression of the LB vServer 275 to that client's 102a packets evaluates to FALSE. As a result, the client 102a will not receive service from the LB vServer 275 and the appliance 200 may return an error to the client 102a. However, for the client 102b from VLAN 5, the listening policy expression of the LB vServer 275 to that client's 102b packets evaluates to TRUE. The appliance 200 then forwards packets from the client 102b from VLAN 5 to the LB vServer 275.

In another example, the appliance 200 includes two vServers 275 named LB1 and LB2. Both vServers 275 have IP addresses of 10.102.27.189, ports of 98, and service types of "http" such that the appliance 200 listens for packets at http://10.102.27.189:98. However, the appliance 200 binds the LB1 vServer 275 to the listening policy of "CLIENT.VLAN.ID==5." Because the appliance 200 does not set the listening priority of the LB1 vServer 275, the vServer's 275 priority defaults to 101. The appliance 200 does not bind the LB2 vServer 275 to any policy. As a result, the LB2 vServer 275 becomes a catch-all vServer for its IP address, port, and service type, and its listening priority defaults to 255.

Clients 102a and 102b from VLAN 5 and VLAN 7, respectively, may attempt to connect to http://10.102.27.189:98. Because one client 102a is from VLAN 5, the listening policy expression of the LB1 vServer 275 to that client's 102a packets evaluates to TRUE, indicating that the client 102a may access the LB1 vServer 275. As the LB2 vServer 275 may service any client, the client 102a may also access the LB2 vServer 275. The appliance 200 determines that the LB1 vServer 275 has a higher listening priority than the LB2 vServer 275 and forwards packets from the client 102a to the LB1 vServer.

Because the other client 102b is from VLAN 7, the listening policy expression of the LB1 vServer 275 to that client's 102b packets evaluates to FALSE. Because the appliance 200 includes a catch-all vServer in LB2 vServer 275, the appliance 200 forwards packets from the 102b to the LB2 vServer.

In yet another example, the appliance 200 includes two vServers 275 named LB1 and LB2. Both vServers 275 have IP addresses of 10.102.27.189, ports of 98, and service types of "http" such that the appliance 200 listens for packets at http://10.102.27.189:98. The appliance 200 binds the LB1 vServer 275 to the listening policy of "CLIENT.VLAN.ID==5" and the LB2 vServer 275 to the listening policy of "CLIENT.VLAN.ID==7."

Clients 102a, 102b, and 102c from VLAN 5, VLAN 7, and VLAN 8, respectively, may attempt to connect to http://10.102.27.189:98. Because one client 102a is from VLAN 5, the listening policy expression of the LB1 vServer 275 to that client's 102a packets evaluates to TRUE and the expression of the LB2 vServer 275 evaluates to FALSE. Then, the appliance 200 forwards packets from the client 102a to the LB1 vServer 275. For the client 102b from VLAN 7, the listening policy expression of the LB1 vServer 275 evaluates to FALSE and the expression of the LB2 vServer 275 evaluates to TRUE. As a result, the appliance 200 forwards packets from the client 102b to the LB1 vServer 275. However, for the client 102c from VLAN 8, the listening policy expressions for both vServers 275 evaluates to FALSE. Because the appliance 200 lacks any catch-all vServers 275 for the IP address, port, and service type requested by the client 102c, the appliance 200 cannot provide the client 102c with service. Therefore, the appliance 200 may return an error message to the client 102c and/or log an error with an administrative service.

In view of the structure, functions and apparatus of the systems and methods described here, the present solution provides an efficient and intelligent system for using a listening policy for a virtual server on an intermediary device. Having described certain embodiments of methods and systems for using the listening policy, it will now become apparent to one of skill in the art that other embodiments incorporating the concepts of the invention may be used. Therefore, the invention should not be limited to certain embodiments, but should encompass the spirit and scope of the claims.

H. Systems and Methods for Policy Based Integration of Horizontally Deployed Wan Optimization Appliances In a network environment of multiple data centers each of which is load balanced by at least one appliance a scalable topology may be used to enable high scalable data center deployment. An appliance 200 for network optimizations may be used in conjunction with one or more horizontally deployed services, such as WAN optimization services, operating on appliances 205, such as WAN optimization appliances or Wanscalers. Appliances 205, which may also be referred to as a Branch Repeater or a WANscaler, may be used for WAN (wide area network) optimization in which normal HTTP processing as well as optimization may be implemented in a Netscaler/ADC processing pipeline of an appliance 200, such as a Netscaler. Virtual servers, such as ANY type transparent load balancing vServers operating on an appliance 200 may be used to intercept TCP traffic incoming on any port and for any IP. ANY type virtual server, operating on any port and for any IP address may be labeled as (*:*) vServer.

Figure 8A:
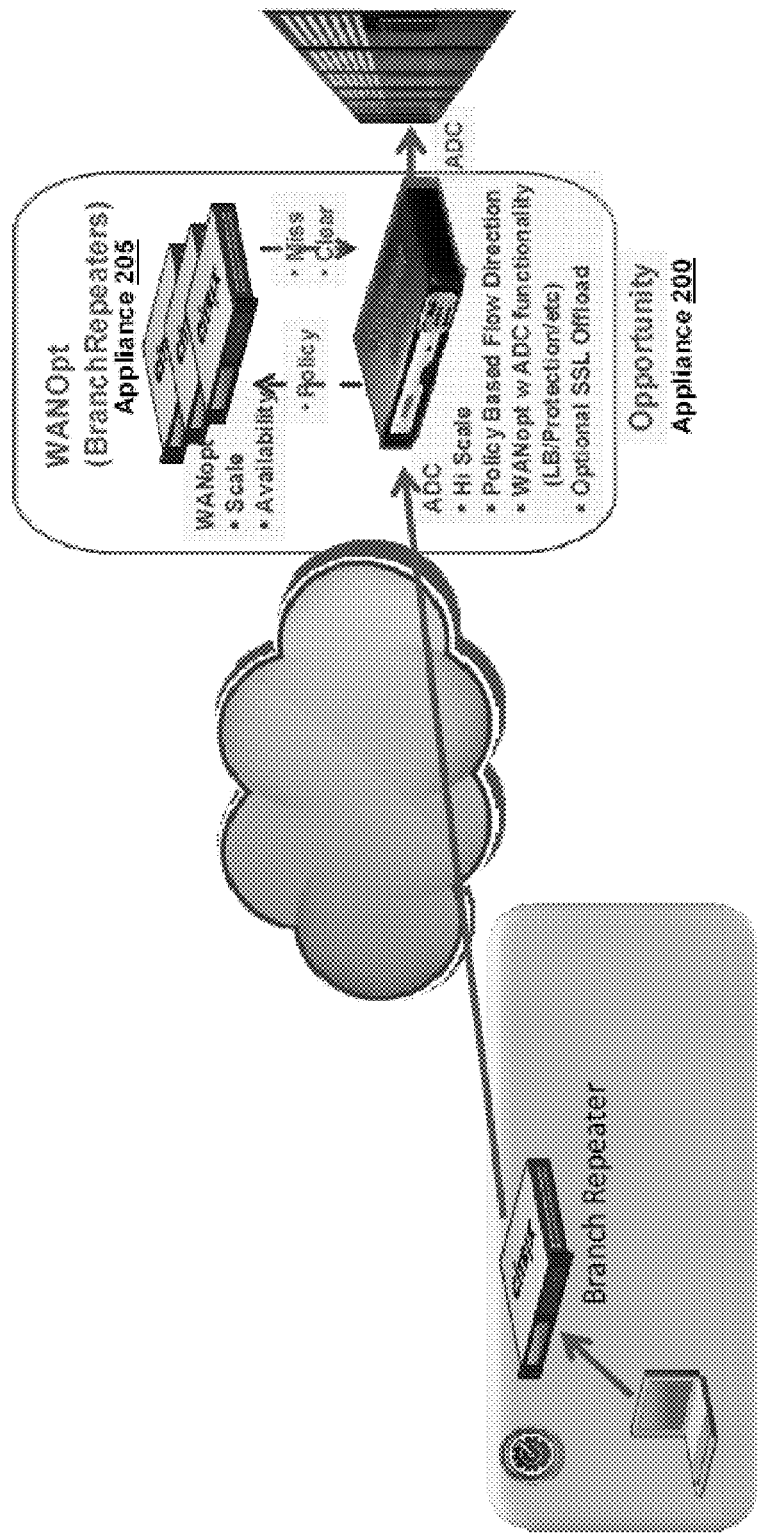
FIG. 8A is a block diagram of an embodiment of a system for policy based integration of an appliance 205, such as WAN optimization appliance, that is horizontally deployed to an appliance 200, such as a Natscaler appliance.

Referring now to FIG. 8A, an embodiment of a WAN optimization topology is illustrated. In the traffic flow of a WAN optimization topology two or more data centers may be operating. An appliance may be deployed at each one of the data centers. The appliances at the data centers may perform load balancing to direct traffic to any number of WAN optimization services, such as in the form of appliance 205 referred to as branch repeaters manufactured by Citrix Systems, Inc.

In one example a client, C1, may send a request to a backend server, V1 via a message that may include IP and port numbers. The message may include information such as V1 (IP1, 80) (C1:cport, IP 1:80). The backend server may be a virtual server, such as vServer 275 configured on a remote, server-side appliance 200, which may also be referred to as the Netscaler 2. As the client-side appliance 200, also referred to as Netscaler 1, may include an ANY type transparent load balancing vServer 275 (*:*), the load balancing virtual server may transparently pick up this incoming connection. The load balancer may be bound to services that include services processed on appliances 205 or branch repeater devices.

Once the request is received, the load balance handler may be called to send the request to the corresponding branch repeater service. The appliance 205 or the branch repeater may process the request by implementing various TCP related services, such as inserting TCP options. The appliance 205 or the branch repeater may then forward the same packet to the appliance 200, or the Netscaler appliance. Once the same packet is received by the appliance 200 or the Netscaler, the Netscaler may know that the packet is coming from a device that has an appliance 205 MAC address. Based on identifying that the packet is coming from the appliance 205, the packet will not be load balanced by the appliance 200 as it will be treated as the return traffic. This packet may be forwarded to the same backend server by creating a transparent NAT (network address translation) session.

The client's request may traverse the internet and be received by the server side appliance 200, or the Netscaler 2. Netscaler 2 may include two load balancing virtual servers configured on the machine. One load balancing vServer may be vServer of type ANY and may be addressed as (*:*), while the other virtual server may be V1 being addressed as (ip1, port1). Once the request is received at Netscaler 2, the ANY load balancing vServer (*:*) may get picked up based on the configured listening policies. Once the ANY load balancing virtual server (*:*) gets picked up, a request may be sent to the services which may include services processed on one or more appliances 205, also referred to as branch repeater devices. The return traffic from these branch repeater devices may be received by the load balancing virtual server V1 (ip1, 80) on the appliance 200 which may then forward the request to the backend service. The same or similar flow of requests and traffic may be implemented on the response traffic from the server back to the client.

In some embodiments, policy expressions that decide whether the request needs to be send to branch repeater or to the backend server are based on traffic features, such as the client port, server port, TCP payload or other network packet features. In some embodiments, new policy expressions are introduced to make evaluations based on TCP options of the network packet.

Figure 8B:
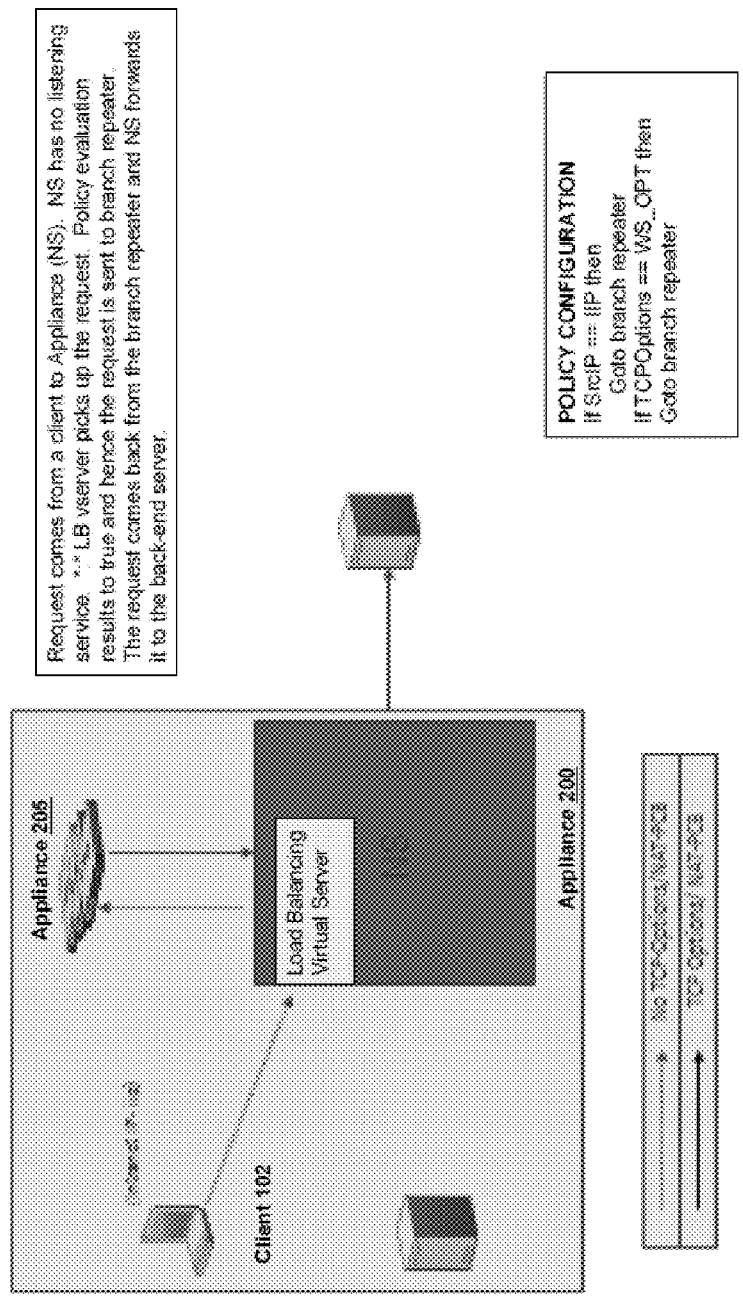
FIG. 8B is a block diagram of another embodiment of a system for policy based integration of an appliance 205 horizontally deployed to an appliance 200.
Figure 8C:
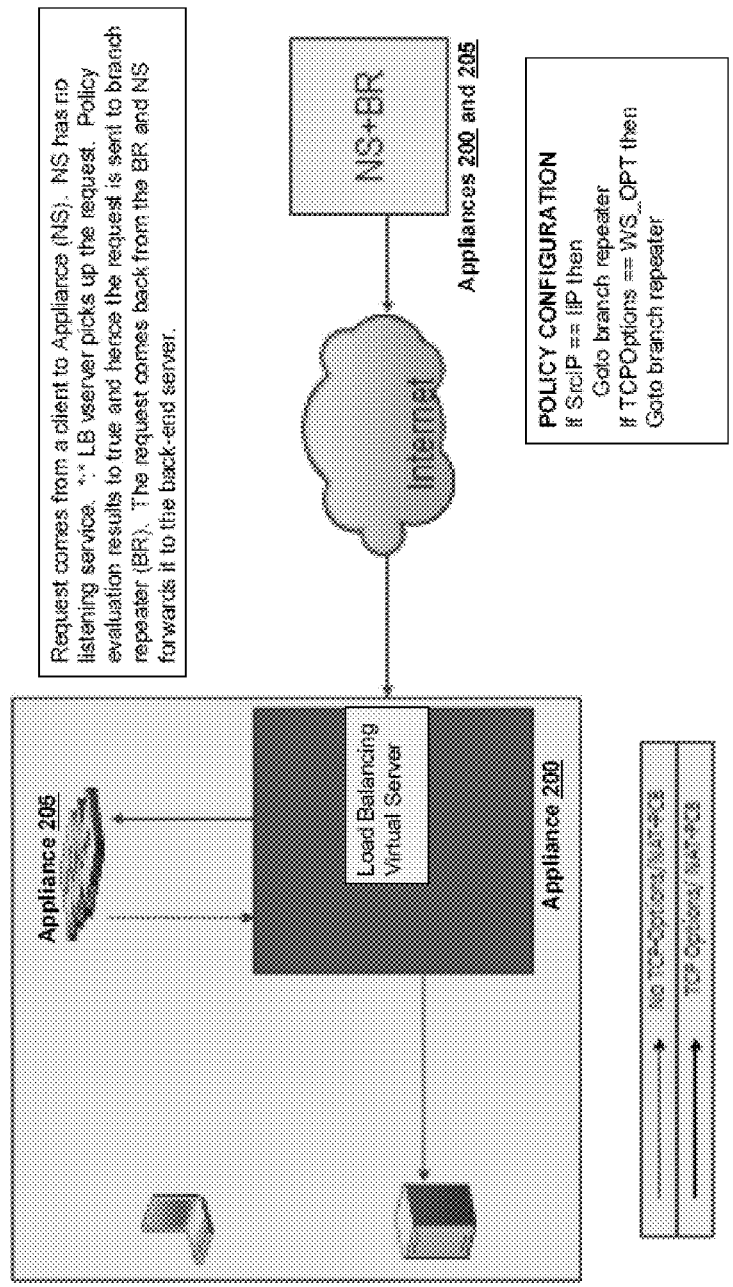
FIG. 8C is a block diagram of another embodiment of a system for policy based integration of an appliance 205 horizontally deployed to an appliance 200.

Referring now to FIGS. 8B and 8C, embodiments of a system for traffic handling using PI policies present in TCP packets. In some embodiments, FIGS. 8A-8B refer to techniques in which newly added policy expressions or PI expressions provide TCP options present in the TCP handshake packets. Such expressions may include, for example CLIENT.TCP.OPTIONS or SERVER.TCP.OPTIONS expression, which may return in the result TCP options or information about TCP options present in a handshake packet sent by a client or a server. In some embodiments, expressions, such as: CLIENT.TCP.OPTIONS.COUNT or SERVER.TCP.OPTIONS.COUNT may return the number of TCP options or information about the number of TCP options present in the client or server sent handshake packet. In further embodiments, an expression, such as CLIENT.TCP.OPTION-S.TYPE (integer) or SERVER.TCP.OPTIONS.TYPE(integer) may return the value of option type whose type is specified by the value of integer. In further embodiments, an expression such as CLIENT.TCP.OPTIONS.TYPE_NAME (enum) or SERVER.TCP.OPTIONS.TYPE_NAME(enum) returns the value of option type whose name may be specified by enum present in the client or server sent handshake packet. Values of enum may be WANSCALER, TIMESTAMP, SACK_PERMITTED, WINDOW or MAXSEG.

In some embodiments, PI expressions, such as those presented above may be used in a listening policy. This may be done for client expressions. In some embodiments, this is done for server expressions. In one embodiment, an ANY type virtual server may be used and so the service may include network managed according to NAT PCBs. PCBs may include dynamic structure resident in memory which stores information about a process. Typical information may include process id, parent process id, process state, memory information, program control data, and general accounting information for a particular connection, session or a communication transmitted over a network. NAT PCBs may include network address translation maps or any other functions for forwarding or rerouting incoming network packets.

In some embodiments, TCP service type may be used as WANscaler TCP Options come in a SYN packet and hence the SYN packet may be stored at the receiving Netscaler appliance to be replayed or transmitted later to the branch repeater appliance. In other embodiments, NAT PCBs hosted on an ANY type virtual server are used to avoid storing of TCP Options of the network packets. In embodiments in which ANY service type is used, the request may not need to be tracked at the appliance and no complex functionalities, such as compression or HTTP parsing need to be done. Such additional compression/decompression, encoding/decoding or parsing functions may be avoided by adding one specific load balancing virtual server so that the Netscaler appliance includes one load balancing virtual server for normal HTTP/TCP traffic and one for branch repeater that may needed to be accelerated. The correct load balancing virtual server may be picked out based on the listen policies.

Referring now to FIG. 8B, a client sends a request from a client to an appliance 200, such as a Netscaler. In some embodiments, the appliance includes listening services. The listening services may be configured to check for a source IP address and then forward the request to a WAN optimization service such as the branch repeater. In some embodiments, the listening services are configured to check for TCP options or WAN optimization options and forward the request to a branch repeater based on the evaluation of such listening service configuration.

An ANY type virtual server marked by (*:*) may pick up the request. The policy configuration may be such that if the request includes a source IP address that is a particular IP address then the request is routed to the branch repeater. A policy may check if TCP options of the request include WAN optimization option or feature, and if the result returns an answer of yes or true, the request may also be forwarded to the branch repeater. Once the request comes back from the WAN optimization service, such branch repeater, the appliance may simply forward the request to the back-end server for processing.

Referring now to FIG. 8C, a request from a client may be received at a Netscaler appliance 200. In some embodiments, the appliance includes listening services. The listening services may be configured to check for a source IP address and then forward the request to a branch repeater appliance 205. In some embodiments, the listening services are configured to check for TCP options or WAN optimization options. The listening services may forward the incoming request to a branch repeater appliance 205 based on the evaluation of the listening service configuration.

A virtual server load balancer, such as an ANY type virtual server having address configuration of (*:*) may pick up the request. Policy configuration may include logic evaluating if the source IP equals to the particular IP, such as the client IP address. If this evaluation produces a result of true, the request may be forwarded to the branch repeater/appliance 205. The policy may also include an expression to evaluate if the TCP options include an option about WAN optimization, such as optimization by appliance 205, such as the branch repeater or the WAN scaler. If the evaluation returns the result of true, the request may be forwarded to the branch repeater.

WAN optimization topology may be deployed between any two data centers with an appliance 200, such as the Netscaler, at the both the data centers load balancing the appliances 205 or the branch repeaters. The following instructions, configurations or commands may support the policy based integration to horizontally deployed WAN optimization devices. The configuration may include various settings, instructions or commands.

For example, appliance 200 on the client side, such as the Netscaler 1, may include settings, configurations and instructions, such as:
enable ns mode USIP
add service SVC_BR_1 brip1 ANY brport1
add service SVC_BR_2 brip2 ANY brport2
add 1b vServer LB_BR_1 ANY * *-m MAC-12conn ON-listenpolicy
client.ip.src.eq(10.102.32.145)-listenpriority 2
bind 1b vServer LB_BR_1 SVC_BR_1
bind 1bv server LB_BR_1 SVC_BR_2

The listen policy, such as the one above, may be configured to accept request from a particular client. A TCP port may be used to segregate the traffic that needs to be accelerated.

For Netscaler 2, the instructions, settings or commands may include:
enable ns mode USIP
add service SVC_BR_1 brip1 ANY brport1
add service SVC_BR_2 brip2 ANY brport2
add 1b vServer LB_BR_1 ANY * *-m MAC-12conn ON-listenpolicy
client.tcp.options.type_name(WANSCALER).exists-listenpriority 2
bind 1b vServer LB_BR_1 SVC_BR_1
bind 1bv server LB_BR_1 SVC_BR_2
Add service svc1 TCP ip port
add 1bvServer v1 TCP ip1 80-12conn ON-listenpolicy
client.tcp.options.tppe_name(WANSCALER).exists.NOT && client.src.ether.EQ(mac)-listenpriority 3
bind 1bvServer v1 svc1
nsapimgr-ys macmode_fwd_mypkt=1

Any number of specific listening policies and virtual servers may be added to segregate the traffic or the traffic flow accordingly. For example if there are three or four different policies to forward the traffic to different branch repeaters dedicated to particular data processing, corresponding listening policies may be added for each one, so that the policies would direct the traffic to each corresponding set of branch repeaters as needed.

In some embodiments, the list of the load balancing methods that are applicable for branch repeaters may include ROUNDROBIN, LEASTCONNECTION, DESTINATIONIPHASH, SOURCEIPHASH, SRCIPDESTIPHASH, LEASTBANDWIDTH, LEASTPACKETS, SRCIPSRCPORTHASH, LRTM and CUSTOMLOAD. The list of load balancing persistency types that may be supported by branch repeaters may include SOURCEIP, DESTIP and SRCIPDESTIP. The list of the monitor types supported for branch repeaters may include PING and TCP.

Figure 8D:
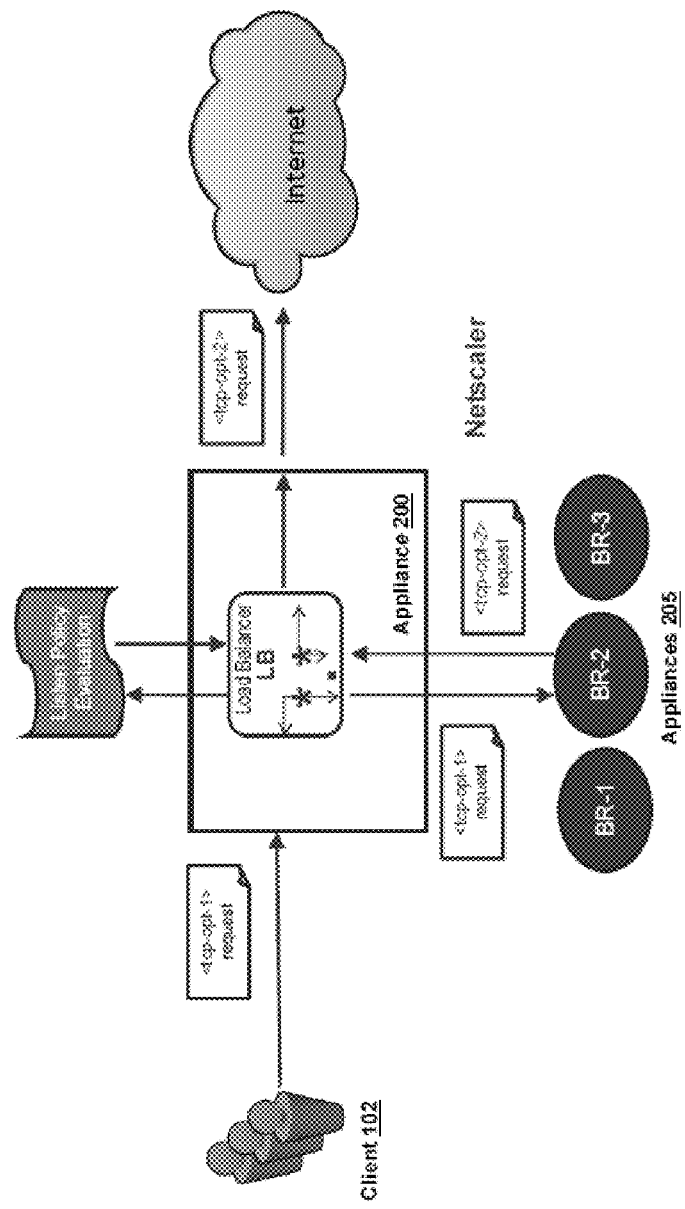
FIG. 8D is a block diagram and a flow diagram of an embodiment of a system and method for policy based integration of appliances 205 horizontally deployed to an appliance 200.

Referring now to FIG. 8D, an embodiment of a request side traffic flow for the system of the present disclosure is illustrated. FIG. 8D illustrates an embodiment in which a Netscaler appliance 200 is deployed between a client and internet within which exists a back-end server to which the client is sending a request. The appliance may comprise a load balancing function operating on a virtual server of type ANY. ANY virtual server may handle network traffic having any IP address and using any port. The load balancer may utilize listening policies for evaluation of the incoming traffic to decide to which of the appliances 205/branch repeaters, such as BR-1, BR-2 or BR-3, to send the incoming traffic.

The client may send a request to directed to the back end server existing somewhere on a wide area network, such as the internet. The request may be a TCP request which may be optimized by an intermediary appliance 200. The request may be labeled as request <TCP-opt-1> and may have any IP address and may utilize any port.

The appliance 200 being deployed anywhere between the client and the back-end server may receive the request. Once the request is received, listening policies on the appliance 200 may be used to evaluate to which virtual server the request will be forwarded. For example, the Netscaler appliance 200 may include any number of virtual servers. Some virtual servers may be identified by a particular port and a particular IP address. Some virtual servers may be ANY type virtual servers being identified by any port and any IP address. The listening policies may include configurations, such as:
If SrcIP==IIP then go to branch repeater. In such embodiments, the listening policy may determine if a source IP address is a particular IP address, and if so, the request will be forwarded to a particular branch repeater. The listening policies may also include configurations, such as: If TCPOptions==WS_OPT then go to branch repeater/appliance 205. In such an embodiment, the listening policy may determine if a WS_OPT or a WANscaler optimization option is selected in the TCP options of the request, and if so, the request is to be forwarded to the branch repeater/appliance 205.

Once the ANY load balancing virtual server (*:*) gets selected, the request may be sent to the services which may include one or more branch repeater devices, such as BR-2. Branch repeater, such as BR-2, may implement the optimization functions on the request and send the request back to the appliance 200. The return request, request <TCP-opt-2>, may be received from BR-2 appliance 205 by the ANY-type load balancing virtual server on the appliance 200 or by another load balancing virtual server that is identified by a particular IP address and a port number.

In some embodiments, the listening policy may evaluate to select a particular virtual server to handle the incoming request. For example, a listening policy may select an ANY type virtual server to handle a request or any other type of virtual server. The identified selected virtual server may load balance a plurality of appliances 205. Once the selected virtual server receives the request, the virtual server may use any function or technique to identify a service on appliances 205 to which to send the request. In some embodiments, the virtual server identifies the service by reading the TCP header information of the request or any other portion of the request to see if the request includes a WAN optimization option or feature. Virtual server may decide forward the request based on a policy evaluation of the WAN optimization feature or option. Virtual server may select a particular appliance 205 to which to forward the request based on any load balancing technique.

Request <TCP-opt-2> may then be forwarded by the appliance 200 further towards the intended back-end server somewhere on the Internet.

Figure 8E:
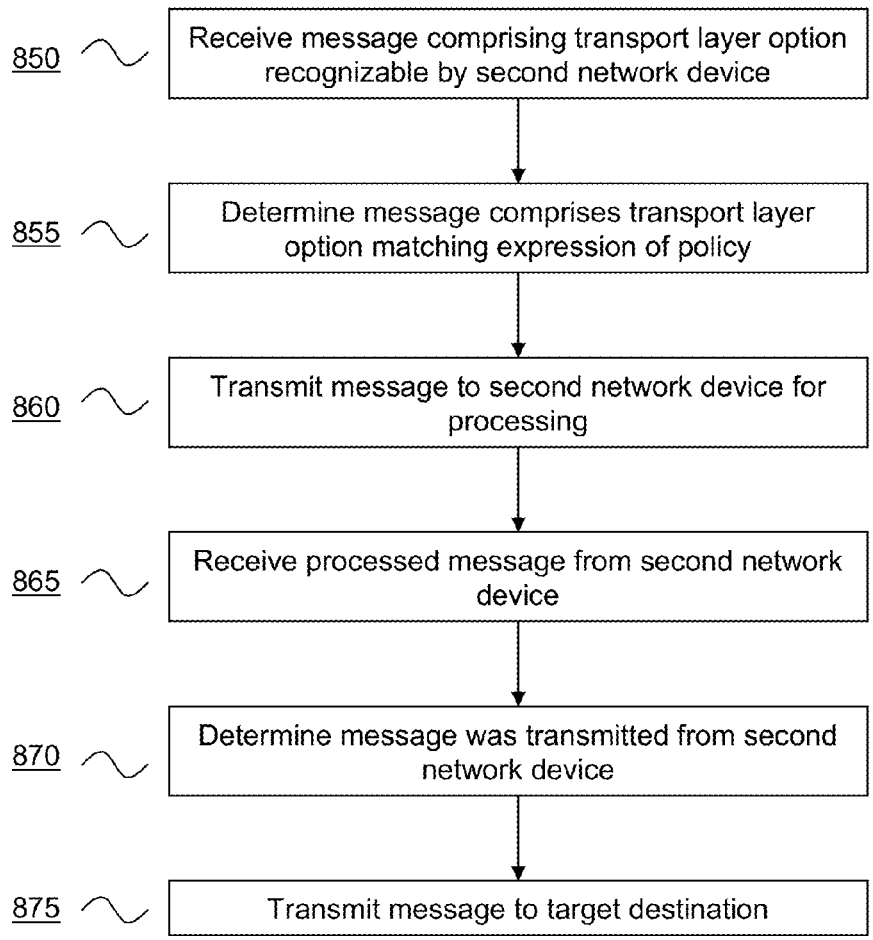
FIG. 8E is a flow diagram of an embodiment of a method for redirecting a message between a client and server to a horizontally deployed network device providing a predetermined service to the message.

Referring now to FIG. 8E, illustrated is a flow diagram of an embodiment of a method for redirecting a message between a client and server, by an intermediary device, to a horizontally deployed network device providing a predetermined service to the message. Embodiments of the method may be used to redirect messages transmitted from a client and directed to a server, transmitted from a server and directed to a client, transmitted from a first client and directed to a second client, transmitted from a first server and directed to a second server, or via any other combination of clients, mobile clients or devices, servers, workstations, intermediary devices, or other computing devices. In brief overview, at step 850, an intermediary device may receive a message from a first device, such as a client, directed to a second device, such as a server. The message may comprise a transport layer option recognizable by a second network device providing a predetermined service. At step 855, the intermediary device may determine that the message comprises the transport layer option, and that the option matches the expression of a policy identifying that the message is to be redirected to the second network device for further processing. At step 860, the intermediary device may transmit the message to the second network device. At step 865, the intermediary device may receive the processed message from the second network device. At step 870, the intermediary device may determine the message was transmitted from the second network device. At step 875, the intermediary device may transmit the message to the target destination.

Still referring to FIG. 8E and in more detail, in some embodiments, at step 850, an intermediary device deployed between a plurality of clients and one or more servers may receive, via a first transport layer connection, a message. In some embodiments, the message may comprise a data packet, a request, a SYN packet, a SYN-ACK packet, an ACK packet, or any other type and form of message. The message may comprise a TCP packet, a UDP packet, or any other type and form of transport layer data protocol. In some embodiments, the message may include one or more payloads. For example, the message may comprise a TCP packet encapsulating an HTTP request. In another example, the message may comprise a TCP packet encapsulating a remote desktop protocol, such as RDP or ICA. Accordingly, the message may comprise any type of data, request, acknowledgement, query, response, or other message. The message may indicate a destination or target destination of a server of the one or more servers. For example, the message may include a destination IP and port of a server.

In some embodiments, the message may comprise or include a transport layer option. For example, the message may include a transport layer header with a string or flag in a TCP options field. In other embodiments, the message may comprise any other type and form of transport layer option, such as a predetermined window scale size, a predetermined or encoded sequence number and/or acknowledgement number, etc. The transport layer option may be recognizable by a second network device providing a predetermined service. For example, the message may comprise a transport layer option indicating the payload of the packet is compressed, and a second network device including a decompression engine may recognize the option and provide decompression services.

The second network device may comprise any type and form of device, service, server, agent, or other entity providing any type of predetermined service, such as compression or decompression, caching, multiplexing or demultiplexing, pooling, encryption or decryption, proxying, or any other type and form of service. In some embodiments, the network device may comprise a WAN optimization device. In some embodiments, the second network device may comprise a device that provides a single sign on service. In some embodiments, the second network device may comprise a device that provides an authentication service. In some embodiments, the second network device may comprise a device that provides an authorization service. In some embodiments, the second network device may comprise a device that provides an auditing service. In some embodiments, the second network device may comprise a device that provides authentication to, login to or access and/or use of a Software-As-A Service, Platform-As-A-Service, Infrastructure-As-A-Service or any cloud based application or service. In some embodiments, the second network device may comprise a device that provides access to a cloud network bridge. In some embodiments, the second network device may comprise a device that provides access to any private, public or hybrid cloud network.

At step 855, in some embodiments, the intermediary device or a virtual server executed by the intermediary device may determine that the message comprises the transport layer option matching an expression of a policy of the virtual server. The policy may identify that the message is to be redirected to the second network device for further processing. For example, in some embodiments, a virtual server, virtual loopback server, or virtual listening server of the intermediary device may parse a transport layer header of the message for a transport layer option. As discussed above, in some embodiments, this may comprise reading an options field, or may comprise reading any other field, flag, string, or payload of the message. The virtual server may match an expression, such as a Boolean string or wildcard string of a policy of the virtual server to the message and/or the transport layer option. For example, in one embodiment, the policy may indicate that any message with a TCP option string including WS_OPT should be redirected to the second network device. In another embodiment, the policy may indicate that any message with a TCP option string including WS_OPT and a source IP within a predetermined range should be redirected to the second network device. Such policies may include wildcards (e.g. "source IP=1.2.3.*"), logic (e.g. "source IP=1.2.3.4 and destination port=27"), or any other type and form of expression. In some embodiments, the virtual server may match a name or value of the transport layer option in the message to the expression of the policy. In another embodiment, the policy may indicate that the presence of any information in an option field of the first request indicates that the message should be redirected to a network device.

In some embodiments, where a message does not include a transport layer option matching an expression, the intermediary device may direct the message to the destination or target destination identified by the message. For example, where the message is sent from a client directed to a server, the intermediary device may direct the message to the server, rather than redirecting the message. In other embodiments, where the message does include a transport layer option matching the expression, the intermediary device may record, store, cache, or otherwise maintain a record of the destination specified by the message. Accordingly, the message may be redirected to the second network device, and, upon being returned from processing by the second network device, may be directed to the recorded destination.

In some embodiments, such as where multiple network devices are available for load balancing purposes or for providing different services, the intermediary device or virtual server may determine which network device of the multiple network devices the message should be directed to. In some embodiments, the virtual server may have explicit redirection instructions, such as instructions in a policy indicating that messages matching a first expression should be directed to a first network device and messages matching a second expression should be directed to a second network device. In other embodiments, the policy may indicate a range or group of devices, and the virtual server may select a device via a round robin, weighted round robin, or other load balancing algorithm.

At step 860, in some embodiments, the intermediary device or the virtual server may transmit the message to the second network device via a second transport layer connection. The second network device may process the message to provide the predetermined service. In some embodiments, the intermediary device may replace a first destination address of the message, such as the target server or client or other device intended as the original recipient, with a second destination address of the second network device. In other embodiments, the intermediary or the virtual server may encapsulate the message as the payload of a second message directed to the second network device. In some embodiments, the virtual server may include in the redirected message the transport layer option matching the policy. The second network device may recognize and utilize the transport layer option in the redirected message to provide the predetermined service.

At step 865, in some embodiments, the intermediary device may receive the message processed by the second network device. As discussed above, the second network device may process the message or apply a service, such as compression, decompression, encryption, multiplexing, or any other type and form of service to the message, and then transmit the message back to the intermediary device.

In some embodiments, the processed message may include the source IP of the original sender, such as a client or server. Accordingly, in such embodiments, other than being processed, the processed message may appear indistinguishable or nearly indistinguishable from the original unprocessed message. In a further embodiment, the network and/or transport layer headers of the processed message may be indistinguishable from the corresponding network and/or transport layers of the original message, with any difference only in the Ethernet frame header, such as a source media access control (MAC) address. This may also be done such that the recipient responding to the message will direct responses to the sender, rather than the second network device, for example. To prevent the processed message from being again redirected to the network device, at step 870, in some embodiments, the intermediary device or the virtual server may determine that the message was transmitted from the second network device. In one embodiment, the virtual server may determine by the source MAC address of the processed message that the processed message was transmitted by the second network device. In some embodiments, the intermediary device may receive processed messages on a first connection, such as a first Ethernet port representing an internal network, such that the intermediary device may recognize by which hardware interface of a plurality of hardware interfaces whether the message came from the second network device.

At step 870, responsive to determining that the processed message was transmitted by the second network device, in some embodiments, the intermediary device may transmit the message to the destination, such as the client or server. Accordingly, based on the determination, the intermediary device may not re-redirect the message to the network device.

The systems and methods described herein may be used to horizontally deploy any type and form of service with the appliance 200. For example, although the techniques above are generally described above in connection with a horizontally deployed WAN optimization service, such as WAN-scaler or branch repeater, any service, such as any cloud based services executing on any cloud platform, such as those offered by Apere, for example SaaS Single Sign On. The techniques may be used for an appliance 200 to redirect and/or traffic manage/load balance any type of web based service, storage service, enterprise application, SaaS or PaaS service. The techniques may be used for an appliance 200 to redirect and/or traffic manage/load balance any type and form of optimization device.

What is claimed:

1. A method for redirecting client requests, by an intermediary device, to a horizontally deployed Wide Area Network (WAN) optimization device providing service to the client request, the method comprising:
   (a) receiving via a first transport layer connection, by an intermediary device deployed between a plurality of clients and one or more servers, a first request from a first client of the plurality of clients to access a first server of the one or more servers, the first request modified by a first Wide Area Network (WAN) optimization device deployed between the client and the intermediary device to include information in a first option field of a transport layer header of the first request for processing by a second WAN optimization device;
   (b) determining, by a virtual server executing on the intermediary device and managing services on the one or more servers on a second network path, responsive to a redirection policy, to send the first request to the second WAN optimization device instead of the server, the second WAN optimization device deployed horizontally to the intermediary device, the horizontally deployed second WAN optimization device communicating with the intermediary device via a first network path that is different from and not a part of a second network path over which network traffic between the plurality of clients and one or more servers traverses the intermediary device;
   (c) establishing, by the intermediary device, a second transport layer connection with the second WAN optimization device; and
   (d) transmitting, by the intermediary device, the first request to the second WAN optimization device via the second transport layer connection on the first network path.

2. The method of claim 1, further comprising including the information in the first option field of the first request in a second option field of a transport layer header of the first request send via the second transport layer connection to the second WAN optimization device.

3. The method of claim 1, wherein the information included in the first option field of the first request for processing by the second WAN optimization device comprises information identifying the first WAN optimization device to the second WAN optimization device.

4. The method of claim 1, wherein the information included in the first option field of the first request comprises instructions to the second WAN optimization device for processing a payload of the first request.

5. The method of claim 1, wherein determining to send the first request to the second WAN optimization device instead of the server comprises identifying a presence of the information in the first option field of the first request.

6. The method of claim 1, wherein determining to send the first request to the second WAN optimization device instead of the server comprises comparing a source IP address of the first client to a predetermined IP address.

7. The method of claim 1, further comprising receiving, by the intermediary device from the second WAN optimization device, the first request processed by the second WAN optimization device to uncompress a payload of the first request.

8. The method of claim 1, further comprising receiving, by the intermediary device from the second WAN optimization device, the first request processed by the second WAN optimization device to form a second request and determining, by the intermediary device, to transmit the second request to the server identified by the first request, responsive to identifying that the second request is received after processing of the first request by the second WAN optimization device.

9. A method for redirecting a message between a client and server, by an intermediary device, to a horizontally deployed network device providing a predetermined service to the message, the method comprising:
  (a) receiving via a first transport layer connection, by an intermediary device deployed between a plurality of clients and one or more servers, a message between a client of the plurality of clients and a server of the one or more servers, the message comprising a transport layer option recognizable by a second network device providing a predetermined service, the second network device communicating with the intermediary device via a first network path that is different from and not a part of a second network path over which network traffic between the plurality of clients and one or more servers traverses the intermediary device;
  (b) determining, by a virtual server executing on the intermediary device and managing services on the one or more servers on the second network path, that the message comprises the transport layer option matching an expression of a policy of the virtual server, the policy identifying that the message is to be redirected to the second network device for further processing;
  (c) transmitting, by the virtual server via a second transport layer connection on the first network path responsive to the determination, the message to the second network device, the second network device processing the message to provide the predetermined service; and
  (d) receiving, by the intermediary device, the message processed by the second network device.

10. The method of claim 9, wherein step (a) further comprises receiving, by the intermediary device, the message comprising one of a request from the client to the server or one of a response from the server to the client.

11. The method of claim 9, wherein step (b) further comprises determining, by the virtual server, that one of a name or a value of the transport layer option in the message matches the expression of the policy.

12. The method of claim 9, wherein step (c) further comprises including, by the virtual server, in the message redirected to the second network device the transport layer option matching the policy.

13. The method of claim 9, wherein step (d) further comprises determining, by the intermediary device via the media access control (MAC) address of the processed message, that the processed message was transmitted by the second network device.

14. The method of claim 9, wherein step (d) further comprises determining, by the intermediary device, to transmit the processed message to one of the client or the server.

15. A system for redirecting a message between a client and server, by an intermediary device, to a horizontally deployed network device providing a predetermined service to the message, the system comprising:
  an intermediary device deployed between a plurality of clients and one or more servers;
  a second network device deployed horizontally to the intermediary device, the second network device communicating with the intermediary device via a first network path that is different from and not a part of a second network path over which network traffic between the plurality of clients and one or more servers traverses the intermediary device, the second network device providing a predetermined service;
  wherein the intermediary device receives a message between a client of the plurality of clients and a server of the one or more servers, the message comprising a transport layer option recognizable by the second network device;
  a virtual server, executing on the intermediary device and managing services on the one or more servers on the second network path, determines that the message comprises the transport layer option matching an expression of a policy of the virtual server, the policy identifying that the message is to be redirected to the second network device for further processing and transmits via a second transport layer connection on the first network path responsive to the determination, the message to the second network device, the second network device processing the message to provide the predetermined service; and
  wherein the intermediary device receives the message processed by the second network device.

16. The system of claim 15, wherein the intermediary device receives the message comprising one of a request from the client to the server or one of a response from the server to the client.

17. The system of claim 15, wherein the virtual server determines that one of a name or a value of the transport layer option in the message matches the expression of the policy.

18. The system of claim 15, wherein the virtual server includes in the request redirected to the second network device the transport layer option matching the policy.

19. The system of claim 15, wherein the intermediary device determines via the media access control (MAC) address of the processed message that the processed message was transmitted by the second network device.

20. The system of claim 15, wherein the intermediary device determines to transmit the processed message to one of the client or the server.

* * * * *